(12) United States Patent
Christiansen

(10) Patent No.: US 9,439,369 B2
(45) Date of Patent: Sep. 13, 2016

(54) WIRED CONTROLLING AND MONITORING SYSTEM FOR IRRIGATION OF LOCALIZED AREAS OF SOIL

(71) Applicant: S-Rain Control A/S, Kvistgaard (DK)

(72) Inventor: Tom Nohr Christiansen, Horsholm (DK)

(73) Assignee: S-RAIN CONTROL A/S, Kvistgaard (DK)

( * ) Notice: Subject to any disclaimer, the term of this patent is extended or adjusted under 35 U.S.C. 154(b) by 446 days.

(21) Appl. No.: 14/011,382

(22) Filed: Aug. 27, 2013

(65) Prior Publication Data
US 2015/0060562 A1    Mar. 5, 2015

(51) Int. Cl.
*G05D 11/00*    (2006.01)
*A01G 25/16*    (2006.01)

(52) U.S. Cl.
CPC .......... *A01G 25/16* (2013.01); *Y10T 29/49716* (2015.01)

(58) Field of Classification Search
CPC ................ A01G 25/16; A01G 25/167; Y10T 29/49716; G05B 2219/2625
USPC ........................................................ 700/284
See application file for complete search history.

(56) References Cited

U.S. PATENT DOCUMENTS

| | | | |
|---|---|---|---|
| 3,723,753 A | 3/1973 | Davis | |
| 4,004,612 A | 1/1977 | Hummel, Jr. et al. | |
| 4,007,458 A | 2/1977 | Hollabaugh | |
| 4,131,882 A * | 12/1978 | Hollabaugh | G08B 25/00 340/12.33 |
| 4,176,395 A * | 11/1979 | Evelyn-Veere | A01G 25/16 137/624.11 |
| 4,535,401 A | 8/1985 | Penn | |
| 5,023,787 A | 6/1991 | Evelyn-Veere | |
| 5,333,785 A * | 8/1994 | Dodds | A01G 25/16 239/67 |
| 5,434,774 A | 7/1995 | Seberger | |
| 5,570,030 A | 10/1996 | Wightman | |
| 5,839,658 A | 11/1998 | Sarver | |
| 5,848,609 A | 12/1998 | Marchesseault et al. | |
| 6,402,048 B1 | 6/2002 | Collins | |
| 6,766,221 B1 | 7/2004 | Christiansen | |
| 6,993,416 B2 | 1/2006 | Christiansen | |
| 7,084,741 B2 | 8/2006 | Plummer | |
| 7,146,255 B2 | 12/2006 | Christiansen | |
| 7,206,669 B2 | 4/2007 | Christiansen | |
| 7,421,317 B2 | 9/2008 | Christiansen | |
| 2002/0171377 A1* | 11/2002 | Mueller | F21S 8/00 315/291 |
| 2004/0130378 A1 | 7/2004 | Kihara | |

* cited by examiner

*Primary Examiner* — Mohammad Ali
*Assistant Examiner* — Sheela S Rao
(74) *Attorney, Agent, or Firm* — Klein, O'Neill & Singh, LLP

(57) ABSTRACT

A controlling and monitoring system for irrigating localized areas includes a first power and control unit supplying power to multiple power outlets; a first plurality of controllable valves connectable to a water pipeline and positioned at first specific areas, each connected by a first control line to a power outlet; a return line interconnecting all of the first plurality of valves and the first power and control unit; a second plurality of controllable valves connectable to the pipeline and positioned at second specific areas, each controlled by a valve control unit having first and second inputs; and a second power and control unit having a first power and control output connected to the return line with the first inputs of the valve control units, and a second power and control output connected to the second input of each of the valve control units via a second control line.

23 Claims, 18 Drawing Sheets

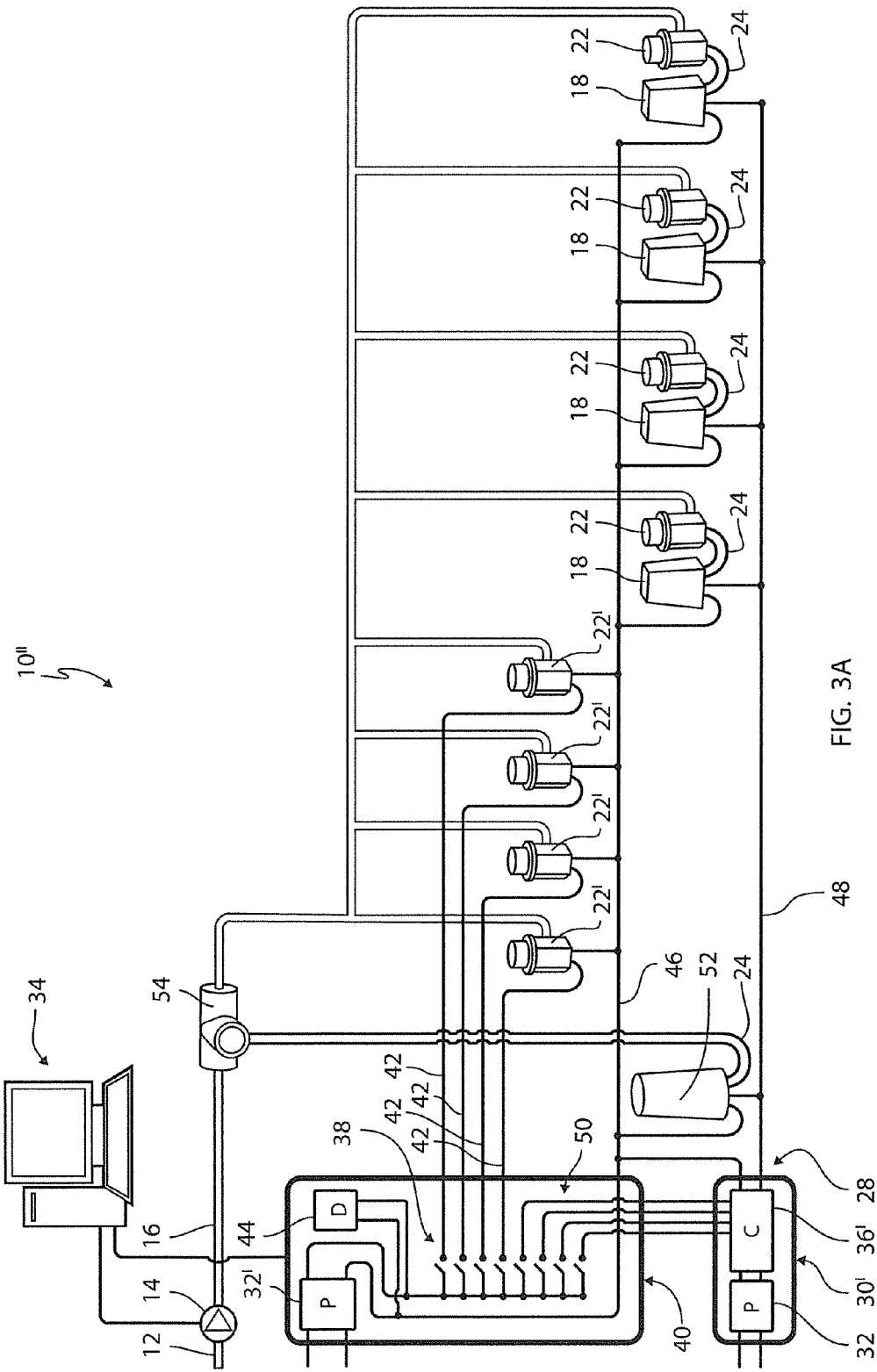

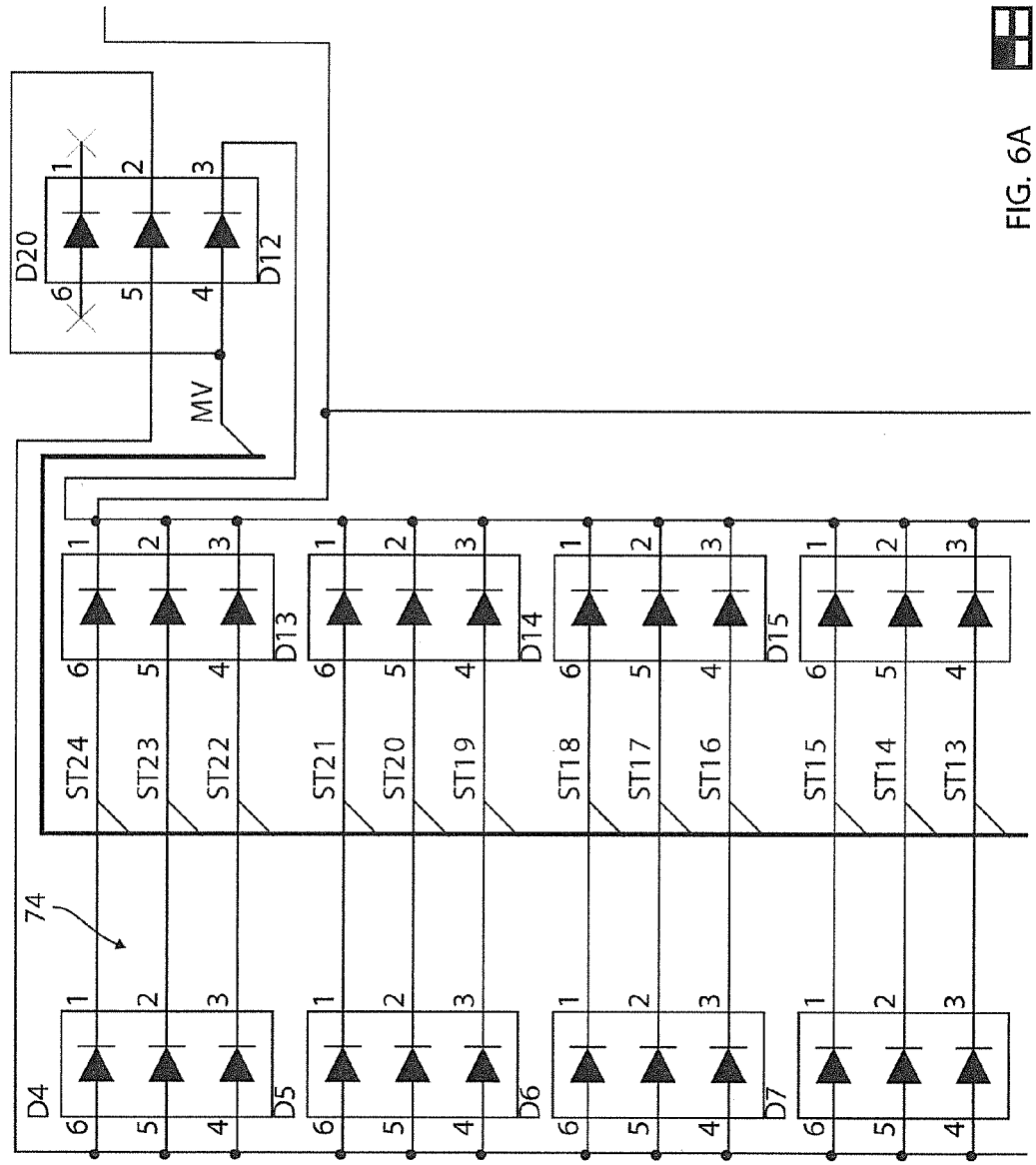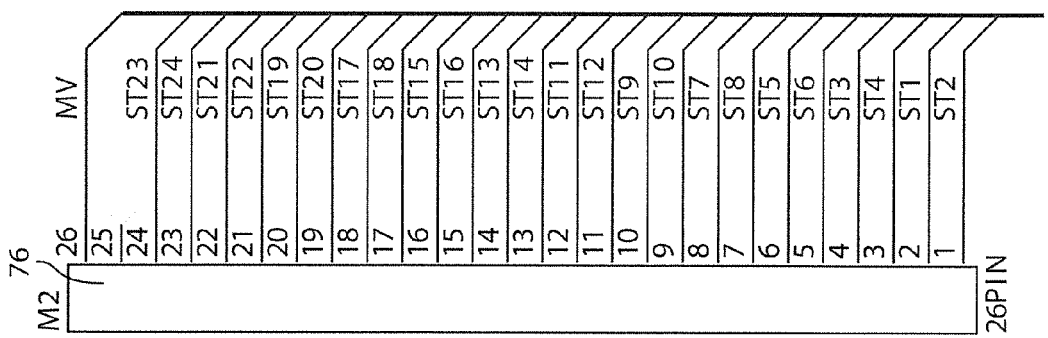
FIG. 6A

WIRED CONTROLLING AND MONITORING SYSTEM FOR IRRIGATION OF LOCALIZED AREAS OF SOIL

CROSS REFERENCE TO RELATED APPLICATION

Not Applicable

FEDERALLY SPONSORED RESEARCH OR DEVELOPMENT

Not Applicable

BACKGROUND

The present disclosure relates to a wired controlling and monitoring system for irrigation of localized areas of soil, a method of operating a wired controlling and monitoring system for irrigation of localized areas of soil, a method of retrofitting an existing wired controlling and monitoring system for irrigation of localized areas of soil, and, a phase shifting circuit for a wired controlling and monitoring system for irrigation of localized areas of soil.

Conventional golf course irrigation systems have a plurality of controllable irrigation valves connected to a water pipe line for watering specific areas of localized areas of soil of the golf course. The controllable irrigation valves each comprise a solenoid which, when a voltage is applied, causes the valve to assume an open state, allowing water from the water pipe to flow out of the valve onto the grass constituting the golf course. When no voltage is applied to the solenoid, the valve assumes a closed state and no water will flow out of the valve.

Each of the controllable irrigation valves has a dedicated line that is directly connected to a voltage source via a switchboard. By operating the switchboard, a voltage may be applied to a specific controllable irrigation valve, which thus assumes the open position in order to start watering specific areas of localized areas of soil of the golf course. When the switchboard is operated again, the valve may be closed and the watering may be stopped. The total number of wires needed is equal to the number of controllable irrigation valves plus one common return line. Such systems, using a dedicated line for communicating with one unit, are typically referred to as a multi-wire system or multi-wire network.

The number of wires may be reduced. One such system is described in U.S. Pat. No. 5,780,938. The system uses an encoder and a decoder, each including oppositely oriented diodes for producing half rectified waveforms. In this way, two valves may be controlled via only two conductor lines. Each valve is thus responsive to either the positive or the negative half rectified waveform.

Modern irrigation systems may utilize only two lines, i.e. a two wire cable, interconnecting all of the controllable irrigation valves via an irrigation control unit. Such system is described in, e.g., U.S. Pat. No. 7,206,669, in which an alternating DC voltage is used and schedules of instructions are sent to the irrigation control units via the two wire cable. Each irrigation control unit opens and closes its associated valve according to the schedules of instructions. Other units, such as sensors, may also communicate via the two wire cable. Other related technologies are described in U.S. Pat. Nos. 6,766,221; 6,993,416; 7,421,317 and 7,146,255. Such systems, using a two wire cable for communicating with many units, are commonly referred to as a two wire system or two wire network.

U.S. Pat. No. 8,352,088 relates to a system for optimizing power to a valve core movable between first and second positions.

In the prior art, technologies for retrofitting existing irrigation control systems exist. Such systems are disclosed in U.S. Pat. No. 5,839,658, which discloses a method in which an existing irrigation system having independent valve control lines extending between a controller and a plurality of valve assemblies is provided. The valve control lines are interconnected by a terminal strip, an encoder is installed within the controller, and a decoder is installed in series with each of the valve assemblies. This technology allows for easy expansion, since the control line for a new valve assembly may be run off from the closest control line and return line. In order to expand the system, it is not required to run an individual control line and return line between the controller and the expanded segment.

However, the above system typically requires a complete retrofit. All of the controllable irrigation valves thereby must be exchanged and retrofitted by an irrigation control unit. Many conventional irrigation systems are very large, and the investment would be very large to retrofit the entire system.

It is thus an object of the present invention to provide technologies for retrofitting only a part of the irrigation system which maintains a part of the irrigation system using conventional technologies.

All of the above mentioned US patents and patent applications are hereby incorporated by reference.

SUMMARY

The above objects, together with numerous other objects which will be evident from the below detailed description, are, in accordance with a first aspect according to the present disclosure, obtained by a wired controlling and monitoring system for irrigation of localized areas of soil from a water pipeline, comprising:

a first power and control unit, preferably comprising a switchboard, having a multitude of power outlets, the first power and control unit being capable of selectively supplying electrical power to one or more of the multitude of power outlets;

a first plurality of controllable irrigation valves, each positioned in a dedicated position at first specific areas of the localized areas of soil and each connected to the water pipe line, each of the controllable irrigation valves of the first plurality of irrigation valves having a dedicated valve control line extending between a specific power outlet of the multitude of power outlets of the switchboard and the specific controllable irrigation valve of the first plurality of controllable irrigation valves;

a common return line interconnecting all of the first plurality of controllable irrigation valves and the first power and control unit;

a second plurality of controllable irrigation valves, each positioned at a dedicated position at second specific areas of the localized areas of soil and each connected to the water pipe line, each of the controllable irrigation valves being controlled by an irrigation valve control unit having a first control and power input and a second control and power input; and a second power and control unit having a first power and control output and a second power and control output, the first power and control output being connected to the common return line together with the first control and power inputs of each of the irrigation valve control units, the second power and control output being connected to the second control and power input of each of the irrigation valve control units of the second plurality of controllable irrigation valves via a further valve control line, the second power and control unit supplying power by applying a first square wave ("alternating DC") voltage signal defining a voltage maximum having a first pulse width and defining a voltage minimum having a second pulse width to the first power and control output, and simultaneously applying a second square wave ("alternating DC") voltage signal similarly shaped but of inverted polarity as compared to the first square wave voltage signal to the second power and control output, the second power and control unit having a set of schedules of instructions, the second power and control unit transmitting the set of schedules of instructions to the irrigation valve control units via the further valve control line and the common return line.

The above system is very cost effective in that the existing dedicated valve control lines may be kept essentially intact as the two wire system is merely supplementing the multi-wire network. At most, one controllable irrigation valve of the first plurality of controllable irrigation valves may be removed in order to re-use the dedicated valve control line as the further valve control line of the two wire network. The first and second power and control units should preferably be galvanically decoupled to avoid crosstalk between the multi-wire network and the two wire network. In this way, the common return line may be held at a floating potential.

The water pipeline, which is held at an elevated water pressure by, e.g., a pump, may be split up into several sub-networks. The water may be provided from the water mains or from a nearby natural or ground water source. As discussed above, each of the controllable irrigation valves has a solenoid or similar actuator which may be controlled by electric power. By providing power from the first power and control unit to the actuator of the irrigation valve, the irrigation valve will assume an open state, and water will flow from the water pipeline to the surrounding soil by the water pressure in the pipeline. The switchboard may comprise a multitude of manual on/off switches, or any kind of electronic switch such as a relay or a semiconductor-based switch. The switchboard will, however, typically be connected to a computer running an appropriate control software.

Each of the controllable irrigation valves of the second plurality of controllable irrigation valves is controlled by an irrigation valve control unit. The irrigation valve control unit will supply power to operate associated controllable irrigation valve if the irrigation valve control unit receives such instructions. It is contemplated that in some situations, one irrigation valve control unit may control more than one controllable irrigation valve; however, for maximum control, one irrigation valve control unit may be limited to control only one controllable irrigation valve. Each irrigation valve control unit may, for example, have a digital address identifying the specific controllable irrigation valves. The second power and control unit may establish schedules of instructions to the irrigation valve control unit that are communicated using the pulse width of the alternations of the DC voltage to represent a digital zero or a digital one. The voltage between the further valve control line and the common return line is constant, since the alternations are simultaneous, and the further valve control line and the common return line always have different polarities, except for the very brief moment of polarity change during the alternation. The voltage difference between the further valve control line and the common return line is used for powering the solenoid in the controllable irrigation valves of the second plurality of controllable irrigation valves, controlled by the irrigation control units.

According to a further embodiment of the first aspect, the first power and control unit and/or the second power and control unit comprise a switch mode supply, a transformer, a multi-winding transformer, a rectifying bridge and/or a DC voltage source. A switch mode supply is preferred due to the very high efficiency of such supply and the capability of supplying any voltage amplitude and frequency from an occasional input voltage. Alternatively, the first plurality of irrigation valves is preferably operated by an AC voltage which may be of lower voltage but similar frequency compared to the electricity mains. The AC voltage applied to the first plurality of irrigation valves may be, e.g., between 10V and 50V, preferably 24V. A transformer may be used in the first power and control unit to transform the mains voltage to the suitable low voltage.

Additionally, the second power and control unit may be powered by another transformer. In this way, the first and second power and control units may be galvanically separated in order to achieve a floating voltage on the common return line without the further valve control line and the plurality of valve control lines influencing each other. The second transformer lowers the voltage to a suitable value, e.g. between 10V and 50V, preferably 24V. The low voltage is fed to a rectifying bridge which is controlled and which may supply the alternating DC voltage to the common return line and the further valve control line.

In order to simplify the power supply, the first and second transformers may share a primary winding. The first and second transformers having separate secondary windings thereby allows for a galvanic separation between the first power and control unit and the second power and control unit. Further, the first power and control unit may be a DC source, such as a battery. Also the second power and control unit may be a DC source, substantially eliminating the need for a rectifier.

According to a further embodiment of the first aspect, the first power and control unit comprises an AC voltage source and the second power and control unit comprises a DC voltage source. In this way it may be assured that the maximum power is available to the irrigation control units.

According to a further embodiment of the first aspect, the switchboard is controlled by a computer. Either the user is controlling the switchboard via the computer, or the computer runs a software program controlling the switchboard.

According to a further embodiment of the first aspect, the second power and control unit is controlled by the switchboard. Preferably, the switchboard controls the second power and control unit such that no additional computer or switchboard is required for the second power and control unit. The schedules of instructions may be established in the second power and control unit based on commands received from the computer. Alternatively, the schedules of instructions may be established in the computer.

According to a further embodiment of the first aspect, the first and second alternating DC voltages define a frequency that is lower than the frequency (typically 50-60 Hz) of the AC power lines or mains. In order to avoid any crosstalk between the further valve control line and the plurality of valve control lines which may possibly influence the instructions sent over the two wire network, i.e., the further valve control line and the common return line, the frequency of the alternating DC voltage may be lower than the frequency of the voltage applied between the plurality of valve control lines and the common return line. The crosstalk may be the result of electrical disturbances originating from the return current of the first plurality of controllable irrigation valves. Current zero crossings of the AC mains voltage and on/off switching operations of the solenoids in the first plurality of controllable irrigation valves may also cause noise on the common return line. Such noise will, however, as a rule, have a frequency equal to or exceeding the mains frequency. By keeping the frequency of the DC alternations lower than the mains frequency, the disturbances may easily be filtered out, such that the communication over the two wire network may be relatively immune against such disturbances. Suitable frequencies for the DC alternation range between 1 and 30 Hz, such as 10 Hz.

According to a further embodiment of the first aspect, the first and second power and control units are galvanically decoupled by means of a capacitor. In the case in which both the first power and control unit and the second power and control unit would comprise a DC source, a capacitor may be used for galvanic separation of the alternating DC provided to the two wire part of the system and the constant DC provided to the multi-wire part of the system.

According to a further embodiment of the first aspect, the wired controlling and monitoring system further comprises a plurality of field sensors each positioned in a dedicated position at third specific areas of the localized areas of soil, providing specific irrigation parameters and having a first sensor output and a second sensor output, the first sensor output being connected to the further valve control line and the second sensor output being connected to the common return line. The two wire network, i.e., the further valve control line and the common return line, may be used for communicating other instructions than the schedules of instructions for the controllable irrigation valve. The system may comprise sensors, e.g., for determining the water content of the soil and thereby the need for activating the controllable irrigation valves. Such communication may be established by, e.g., temporarily short circuiting the two wire network. The pulse width between two subsequent short circuitings may code for either a digital zero or a digital one.

According to a further embodiment of the first aspect, the wired controlling and monitoring system further comprises a plurality of controllable light sources, each positioned in a dedicated position at fourth specific areas of the localized areas of soil and having a first light source input and a second light source input, the first light source input being connected to the further valve control line and the second light source input being connected to the common return line. In the same way as a controllable irrigation valve, a controllable light source may be connected to the two wire network, i.e. between the further valve control line and the common return line. The light source may be controlled by an electric switch such as a relay or a semiconductor switch. The light source will be identified by an address and receive instructions to either light up or turn off. The power for the light sources may be provided from an external mains socket, or via the voltage difference between the further valve control line and the common return line.

According to a further embodiment of the first aspect, the wired controlling and monitoring system further comprises a plurality of controllable fountains each positioned in a dedicated position at fifth specific areas of the localized areas of soil and having a first fountain control input and a second fountain control input, the first fountain control input being connected to the further valve control line and the second fountain control input being connected to the common return line. The fountains may be controlled in a similar way as the second plurality of controllable irrigation valves, except that the water in the fountain is circulated and not necessarily provided by a water pipeline.

According to a further embodiment of the first aspect, the second plurality of controllable irrigation valves comprise between 3 and 1000 controllable irrigation valves. A large number of controllable irrigation valves connected to the same two wire network means that a large number of wires may be omitted when comparing with the multi-wire system. The maximum number of controllable irrigation valves connected to the same two wire network is determined by the signal bandwidth and the power consumption.

The above objects, together with numerous other objects which will be evident from the below detailed description, are in accordance with a second aspect according to the present disclosure, obtained by a method of operating a wired controlling and monitoring system for irrigation of localized areas of soil from a water pipeline, the controlling and monitoring system comprising:

a first power and control unit, preferably comprising a switchboard, having a multitude of power outlets, the first power and control unit being capable of selectively supplying electrical power to one or more of the multitude of power outlets;

a first plurality of controllable irrigation valves, each positioned in a dedicated position at first specific areas of the localized areas of soil and each connected to the water pipe line, each of the controllable irrigation valves of the first plurality of irrigation valves having a dedicated valve control line extending between a specific power outlet of the multitude of power outlets of the switchboard and the specific controllable irrigation valve of the first plurality of controllable irrigation valves;

a common return line interconnecting all of the first plurality of controllable irrigation valves and the first power and control unit;

a second plurality of controllable irrigation valves, each positioned at a dedicated position at second specific areas of the localized areas of soil and each connected to the water pipe line, each of the controllable irrigation valves being controlled by an irrigation valve control unit having a first control and power input and a second control and power input; and a second power and control unit having a first power and control output and a second power and control output, the first power and control output being connected to the common return line together with the first control and power inputs of each of the irrigation control units, the second power and control output being connected to the second control and power input of each of the irrigation valve control units of the second plurality of controllable irrigation valves via a further valve control line;

the method comprising the steps of:

selectively operating the switchboard for allowing an electrical current to flow from the first power and control unit via a dedicated valve control line to the common return line for causing a specific controllable irrigation valve of the first plurality of controllable irrigation valves to assume an open position, thereby providing water to the dedicated position;

applying a first square wave ("alternating DC") voltage signal defining a voltage maximum having a first pulse width and defining a voltage minimum having a second pulse width to the first power and control output by using the second power and supply unit, simultaneously applying a second square wave ("alternating DC") voltage signal similarly shaped but of inverted polarity as compared to the first square wave voltage signal to the second power and control output by using the second power and supply unit, the second power and control unit having a set of schedules of instructions; and transmitting the set of schedules of instructions to the irrigation valve control units via the further valve control line and the common return line by using the second power and supply unit.

The above method according to the second aspect may preferably be used together with the system according to the first aspect. It is understood that initially, the switchboard is set in an all off position, such that no power is transmitted by any of the multitude of power outlets. All of the first plurality of controllable irrigation valves assumes a closed position, i.e., no water flows out of the valve. By operating the switchboard, a specific controllable irrigation valve of the first plurality of controllable irrigation valves selected by the user is powered and will thus open, providing watering to the soil surrounding the valve. Watering continues until the power to the valve is interrupted by using the switchboard.

The square wave voltages are continuously applied to the further valve control line and the common return line for powering the two wire network. The second plurality of controllable irrigation valves remain closed until appropriate schedules of instructions are received by the specific irrigation valve control unit, i.e., until the specific irrigation valve control unit receives instructions to open. Typically, the switchboard is used for applying a control signal to the second power and control unit indicating that a specific controllable irrigation valve of the second plurality of controllable irrigation valves should be opened. The second power and control unit establishes the set of schedules of instructions for opening the specific controllable irrigation valve of the second plurality of controllable irrigation valves, e.g., including the address of the specific irrigation valve control unit and a command to open.

The set of schedules of instructions is transmitted to the irrigation control units by varying the pulse width of the square wave or "alternating DC" voltages. The set of schedules of instructions is interpreted by the irrigation valve control units, and the appropriate irrigation valve control unit will transmit power to the relevant controllable irrigation valve of the second plurality of controllable irrigation valves. The use of square wave or "alternating DC" voltage assures that the irrigation valve control units are always powered.

According to a further embodiment of the second aspect, the switchboard is used for applying a control signal to the second power and control unit, indicating that a specific controllable irrigation valve of the second plurality of controllable irrigation valves should be opened. The same switchboard that is used for controlling the first plurality of controllable irrigation valves may also be used for controlling the second plurality of controllable irrigation valves.

The above objects, together with numerous other objects which will be evident from the below detailed description, are in accordance with a third aspect according to the present disclosure obtained by a method of retrofitting an existing wired controlling and monitoring system for irrigation of localized areas of soil from a water pipeline, the method comprising the steps of:

(a) providing an existing wired controlling and monitoring system comprising:
  a first power and control unit, preferably comprising a switchboard, having a multitude of power outlets, the first power and control unit being operable to selectively supply electrical power to one or more of the plurality of power outlets;
  a first plurality of controllable irrigation valves, each positioned in a dedicated position at first specific areas of the localized areas of soil and each connected to the water pipe line, each of the controllable irrigation valves of the first plurality of irrigation valves having a dedicated valve control line extending between the switchboard and the specific controllable irrigation valve of the first plurality of controllable irrigation valves; and
  a common return line interconnecting all of the first plurality of controllable irrigation valves and the first power and control unit;

(b) installing a second plurality of controllable irrigation valves at a dedicated position at second specific areas of the localized areas of soil and each connected to the water pipe line, each of the controllable irrigation valves being controlled by an irrigation valve control unit having a first control and power input and a second control and power input; and (c) installing a second power and control unit having a first power and control output and a second power and control output, the first power and control output being connected to the common return line together with the first control and power inputs of each of the irrigation valve control units, the second power and control output being connected to the second control and power input of each of the irrigation valve control units of the second plurality of controllable irrigation valves via a further valve control line, the second power and control unit supplying power by applying a first square wave ("alternating DC") voltage signal defining a voltage maximum having a first pulse width and defining a voltage minimum having a second pulse width to the first power and control output, simultaneously applying a second square wave ("alternating DC") voltage signal similarly shaped but of inverted polarity as compared to the square wave voltage signal to the second power and control output, the second power and control unit having a set of schedules of instructions, the second power and control unit transmitting the set of schedules of instructions to the irrigation valve control units via the further valve control line and the common return line.

The above method according to the third aspect may preferably be used together with the system according to the first aspect or the method according to the second aspect. The two wire network is thereby integrated into an existing multi-wire system. The requirement of digging a separate return line for the two wire system is thus avoided, since the common return line of the multi wire system is used.

According to a further embodiment of the third aspect, the method comprises the additional steps of disconnecting one of the valve control lines from the switchboard and one of the first plurality of controllable irrigation valves, and connecting the second power and control output to the second control and power input of each of the irrigation valve control units of the second plurality of controllable irrigation valves via the one of the valve control lines and the further valve control line. In this way, one of the existing valve control lines may be re-used for easy expansion, avoiding the need for installing long portions of new wire. The disconnected controllable irrigation valve of the first plurality of controllable irrigation valves may be replaced by an irrigation valve control unit and a controllable irrigation valve of the second plurality of controllable irrigation valves. Further irrigation valve control units and controllable irrigation valves of the second plurality of controllable irrigation valves may be added.

The above objects, together with numerous other objects which will be evident from the below detailed description, are in accordance with a fourth aspect according to the present disclosure obtained by a wired controlling and monitoring system for irrigation of localized areas of soil from a water pipeline, comprising:

a first power and control unit, preferably comprising a switchboard, having a multitude of power outlets, the first power and control unit being capable of selectively supplying electrical power to one or more of the multitude of power outlets;

a first plurality of controllable irrigation valves, each positioned in a dedicated position at first specific areas of the localized areas of soil and each connected to the water pipe line, each of the controllable irrigation valves of the first plurality of irrigation valves having a dedicated valve control line extending between a specific power outlet of the multitude of power outlets of the switchboard and the specific controllable irrigation valve of the first plurality of controllable irrigation valves;

a common return line interconnecting all of the first plurality of controllable irrigation valves and the first power and control unit;

a phase shift detector connected to the first power and control unit for detecting a phase shift between current and voltage on any of the multitude of power outlets;

a second plurality of controllable irrigation valves, each positioned at a dedicated position at second specific areas of the localized areas of soil and each connected to the water pipe line, each of the controllable irrigation valves being controlled by an irrigation valve control unit having a first control and power input and a second control and power input; and a second power and control unit having a first power and control output and a second power and control output, the first power and control output being connected to the common return line together with the first control and power inputs of each of the irrigation valve control units, the second power and control output being connected to the second control and power input of each of the irrigation valve control units of the second plurality of controllable irrigation valves via a further valve control line, the second power and control unit supplying power by applying a first square wave ("alternating DC") voltage signal defining a voltage maximum having a first pulse width and defining a voltage minimum having a second pulse width to the first power and control output, simultaneously applying a second square wave ("alternating DC") voltage signal similarly shaped but of inverted polarity as compared to the first square wave voltage signal to the second power and control output, the second power and control unit having a set of schedules of instructions, the second power and control unit transmitting the set of schedules of instructions to the irrigation valve control units and receiving valve status information indicating a change from a closed state to an open state of a specific controllable irrigation valve of the second plurality of controllable irrigation valves from the irrigation valve control units via the further valve control line and the common return line, the second power and control unit being connected to the switchboard, each of the controllable irrigation valves of the second plurality of irrigation valves being represented by a dedicated valve representation line connected to the switchboard and the phase shift detector, the second power and control unit further comprising a phase shifting circuit, the phase shifting circuit interconnecting a specific valve representation line representing the specific controllable irrigation valve and the common return line generating a phase difference representing a phase shift between current and voltage of the specific valve representation line when valve status information indicates a change from a closed state to an open state of a specific controllable irrigation valve of the second plurality of controllable irrigation valves, the phase shift being detectable by the phase shift detector.

The above method according to the fourth aspect may preferably be used together with the system according to the first aspect or any of the methods according to the second or third aspects. Both the first and the second power and control unit are thereby typically fed by an AC voltage, such as the electric mains transformed to a suitable low voltage AC. The positive acknowledgement that the valve is opening is established differently for the first plurality of controllable irrigation valves and the second plurality of controllable irrigation valves. In the present aspect, both the first and the second power and control units are connected to the switchboard. Whereas the first plurality of controllable irrigation valves is connected directly to the switchboard, the second plurality of controllable irrigation valves is connected to the second power and control unit. The switchboard is used as an input for the second power and control unit, such that each of the controllable irrigation valves of the second plurality of irrigation valves is represented by a dedicated valve representation line connected to the switchboard.

When any of the first plurality of controllable irrigation valves is opening, the inductance of the solenoid in the valve will cause a phase shift between the voltage and the current supplied in the valve control line. This phase shift will be detectable at the first power and control unit. For this purpose, a phase shift detector is included in the first power and control unit; however, the phase detector may also be a separate unit. If a phase shift is detected, it is concluded that the valve has been opening correctly, whereas if no phase shift is detected, it is concluded that a fault is present, e.g. a short circuit or the like.

When any of the second plurality of controllable irrigation valves is opening, the acknowledgement is typically established within the associated irrigation valve control unit or by a sensor. The acknowledgement confirming the opening of any of the second plurality of controllable irrigation valves is sent as a digital instruction, e.g., by short circuiting the two wire network forming digital ones and digital zeroes. This information may be read at the second power and control unit. In order for the phase shift detector to indicate also when any of the second plurality of controllable irrigation valves is opening, the phase shift must be simulated. This is performed by means of the phase shifting circuit, which, if a positive acknowledgement is received that any of the second plurality of controllable irrigation valves is opening, shifts the phase of the voltage and current on the appropriate valve representation line.

According to a further embodiment of the fourth aspect, the phase shifting circuit comprises a capacitor. A capacitor interconnecting a specific valve representation line representing the specific controllable irrigation valve and the common return line will yield a phase shift between current and voltage of the specific valve representation line.

According to a further embodiment of the fourth aspect, the phase shifting circuit detects the phase shift between the current and the voltage on a power inlet of the switchboard. In this way, the phase shifting circuit must only be connected to one connector.

According to a further embodiment of the fourth aspect, the phase shifting circuit detects the phase shift between the current and the voltage at all of the multitude of power outlets of the switchboard. In this way, the phase shifting circuit may directly determine which of the controllable irrigation valves have been opened.

The above objects, together with numerous other objects which will be evident from the below detailed description, are in accordance with a fifth aspect according to the present disclosure obtained by a phase shifting circuit for a wired controlling and monitoring system for irrigation of localized areas of soil from a water pipeline, the system comprising:
- a first power and control unit, preferably comprising a switchboard, having a multitude of power outlets, the first power and control unit being capable of selectively supplying electrical power to one or more of the multitude of power outlets;
- a first plurality of controllable irrigation valves, each positioned in a dedicated position at first specific areas of the localized areas of soil and each connected to the water pipe line, each of the controllable irrigation valves of the first plurality of irrigation valves having a dedicated valve control line extending between a specific power outlet of the multitude of power outlets of the switchboard and the specific controllable irrigation valve of the first plurality of controllable irrigation valves;
- a common return line interconnecting all of the first plurality of controllable irrigation valves and the first power and control unit;
- a phase shift detector connected to the first power and control unit for detecting a phase shift between current and voltage on any of the multitude of power outlets;
- a second plurality of controllable irrigation valves, each positioned at a dedicated position at second specific areas of the localized areas of soil and each connected to the water pipe line, each of the controllable irrigation valves being controlled by an irrigation valve control unit having a first control and power input and a second control and power input; and
- a second power and control unit having a first power and control output and a second power and control output, the first power and control output being connected to the common return line together with the first control and power inputs of each of the irrigation control units, the second power and control output being connected to the second control and power input of each of the irrigation valve control units of the second plurality of controllable irrigation valves via a further valve control line, the second power and control unit supplying power by applying a first square wave ("alternating DC") voltage signal defining a voltage maximum having a first pulse width and defining a voltage minimum having a second pulse width to the first power and control output, simultaneously applying a second square wave ("alternating DC") voltage signal similarly shaped but of inverted polarity as compared to the first square wave voltage signal to the second power and control output, the second power and control unit having a set of schedules of instructions, the second power and control unit transmitting the set of schedules of instructions to the irrigation valve control units and receiving valve status information indicating a change from a closed state to an open state of a specific controllable irrigation valve of the second plurality of controllable irrigation valves from the irrigation valve control units via the further valve control line and the common return line, the second power and control unit being connected to the switchboard, each of the controllable irrigation valves of the second plurality of irrigation valves being represented by a dedicated valve representation line connected to the switchboard and the phase shift detector;
- the phase shifting circuit being configured for being connected to a specific valve representation line representing the specific controllable irrigation valve and the common return line generating a phase difference representing a phase shift between current and voltage of the specific valve representation line when valve status information indicates a change from a closed state to an open state of a specific controllable irrigation valve of the second plurality of controllable irrigation valves, the phase shift being detectable by the phase shift detector.

The above method according to the fifth aspect may preferably be used together with any of the systems according to the first or fourth aspects or any of the methods according to the second or third aspects. It is evident that the phase shifting circuit may be provided as an accessory.

BRIEF DESCRIPTION OF THE DRAWINGS

FIG. 3A is a schematic view of a wired irrigation system having a multi-wire part and a two wire part.

FIGS. 6A-6D is a series of circuit diagrams that together show a second circuit board layout of an irrigation control system in accordance with the present disclosure.

DETAILED DESCRIPTION

Figure 1:
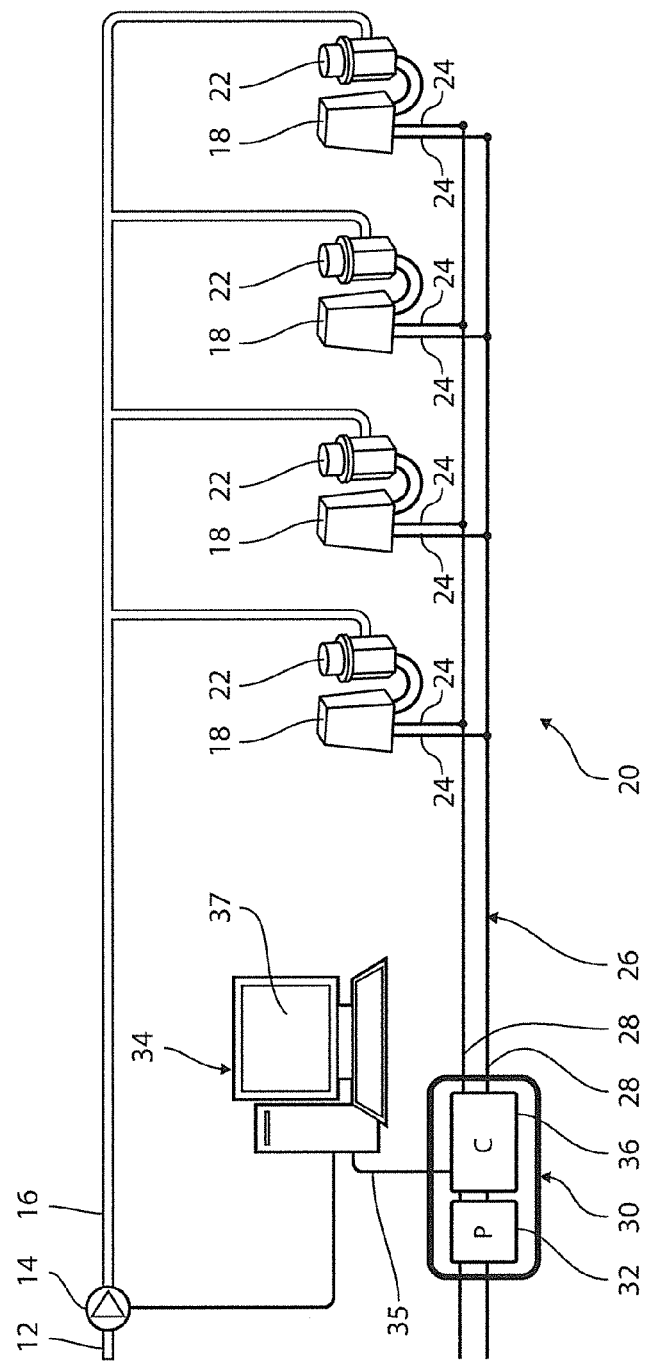
FIG. 1 is a schematic view of a two wire irrigation control system.

FIG. 1 shows a two wire irrigation control system 10. The two wire irrigation control system 10 provides irrigation of localized areas of soil, such as certain areas of golf courses, parks having tree sections, lawns, flower beds, greenhouse production lines, vegetables or farming fields, all having a variety of plants needing a variety of amounts of irrigation. Such two wire irrigation control systems are typically controlled from a remote location which eliminates the need for an operator to be present at the localized areas of soil. The two wire irrigation control system 10 will now be explained in detail below.

The two wire irrigation control system 10 has a water inlet connection 12 supplying water from a water source (not shown), such as a local ground water well, a general household water pump station, a spring, a desalination plant or a water tank, to a pump 14. The pump 14 is mechanically, pneumatically, hydraulically, electrically or magnetically driven or driven by combinations thereof, and it provides a water pressure on a water pipeline 16 enabling the water pipeline 16 to supply water. The water pipeline 16 may be constructed from metal pipes produced in materials such as iron, steel, copper, aluminum, silver, gold or any alloys thereof, and/or plastic pipes produced in materials such as PVC, PP or PE or any combinations thereof.

A plurality of localized irrigation valve control units 18 are positioned at the series of localized areas of soil 20. Each of the irrigation valve control units 18 is connected to a specific controllable irrigation valve 22. Each of the controllable irrigation valves 22 is connected to the water pipeline 16 for providing irrigation to specific areas of each of the localized areas of soil 20. Each of the plurality of controllable irrigation valves 22 may be set to one of two states. The first state is an irrigation state or open state, in which water is provided from the water pipeline 16 to the localized areas of soil 20 via the controllable irrigation valve 22. The second state is a non-irrigation state or closed state in which no irrigation water is provided by the controllable irrigation valve 22. Each of the localized irrigation valve control units 18 is connected to its corresponding controllable irrigation valve 22 for switching the controllable irrigation valves 22 between the irrigation state and the non-irrigation state. It is contemplated that an irrigation valve control unit 18 may control several controllable irrigation valves.

Each of the plurality of localized irrigation valve control units 18 is connected to a pair of power and control outputs 28 of a two wire power and control unit 30 via a two-wire cable 26. The power and control unit 30 transmits power and schedules of instructions to the plurality of localized irrigation valve control units 18 via the two-wire cable 26. The power and control unit 30 comprises a power supply 32. The power supply 32 is typically a switch mode supply that is configured for rectifying and lowering an AC mains or line voltage, typically being between 100VAC and 250VAC, to a lower DC voltage, such as 24VDC. Alternatively, the power supply 32 may include a transformer (not shown) and a rectifying bridge (not shown), as is well-known. Instead of using a transformer or switch mode supply together with the mains power supply, a DC voltage source, such as a battery pack or a set of solar panels, may be used.

The low voltage DC is transmitted to a controller 36 configured for applying a square wave voltage (which may be considered an "alternating DC voltage") on the power and control outputs 28 of the two-wire power and control unit 30. The power and control unit 30 also sends instructions to the irrigation valve control units 18 over the two-wire cable 26 by varying the pulse widths of the square wave or "alternating DC" voltage according to predetermined patterns encoding for the opening and closing of a specific controllable irrigation valve 22. The controller 36 of the power and control unit 30 is connected to a computer 34 by a data cable 35, such as a USB cable. The computer 34 is used for establishing the schedules of instructions based on either a user request for opening or closing a specific controllable irrigation valve 22, or a software program opening and closing the specific controllable irrigation valve 22 according to various parameters, such as time of day, sensor input, weather forecasts etc.

Figure 8:
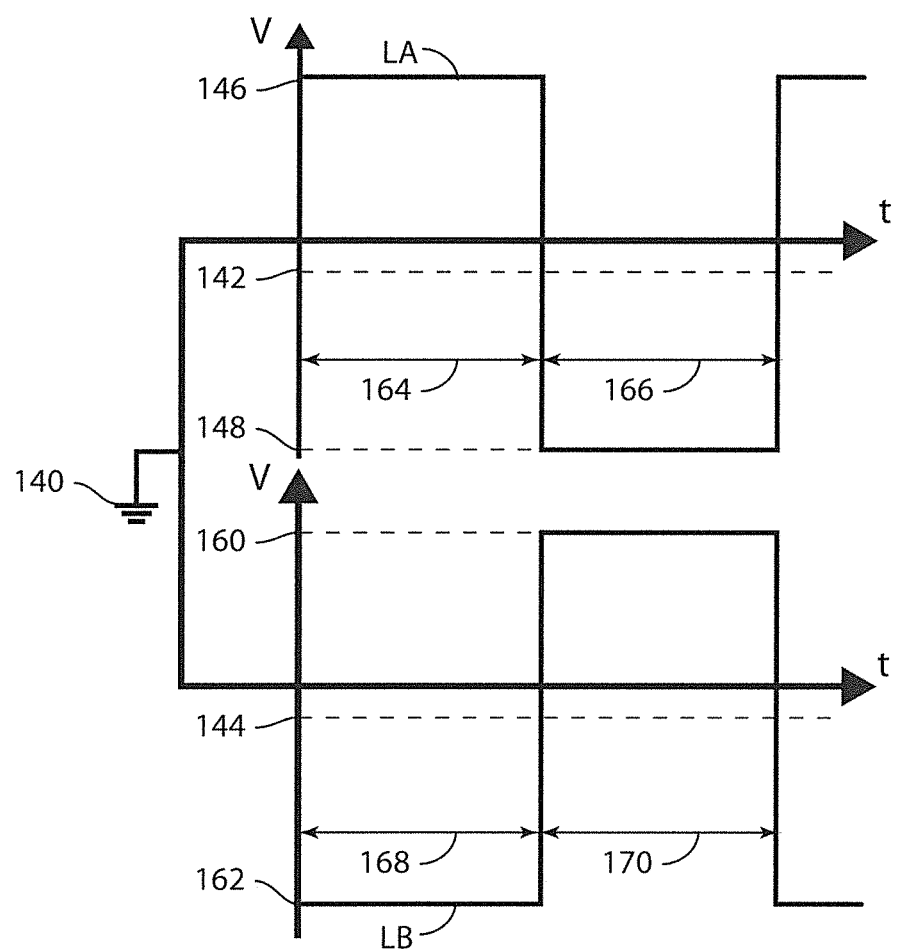
FIG. 8 shows square wave ("alternating DC") voltage signals versus time provided from a power and control unit on a two-wire cable to at least one of the localized irrigation control units.

FIG. 8 shows voltage versus time curves of a first square wave ("alternating DC") voltage signal, designated by LA, and a second square wave ("alternating DC") voltage signal, designated by LB, simultaneously provided by the power and control unit 30 to the two-wire cable 26 for powering of the irrigation valve control units 18.

The first square wave voltage signal LA has a positive pulse with a pulse width 164 in the range 450 ms to 550 ms and a negative pulse with a pulse width 166 in the range 450 ms to 550 ms. In the presently preferred embodiment, the positive pulse width 164 and the negative pulse width 166 are both approximately 500 ms.

The first square voltage signal LA has a maximum voltage 146 in the range of +10V to +20V and has a minimum voltage 148 in the range of −15V to −25V. In the presently preferred embodiment, the maximum voltage 146 is +15V and the minimum voltage 148 is −20V.

The first square wave voltage signal LA is symmetrical about a line 142 indicating a negative offset voltage of the first square voltage signal LA. In the presently preferred embodiment, the offset voltage is approximately −2V.

The second square wave voltage signal LB is inverted in comparison with the first square wave voltage signal LA and has a negative pulse with a pulse width 168 in the range of about 450 ms to 550 ms, and a positive pulse with a pulse width 170, also in the range of about 450 ms to 550 ms. In the presently preferred embodiment, both the negative pulse width 168 and the positive pulse width 170 are approximately 500 ms.

The term "inverted" in this context means a phase shift of about 180 degrees between the first square wave voltage signal LA and the second square wave voltage signal LB.

The second alternating DC voltage signal LA has a maximum voltage 160 in the range of +10V to +20V and a minimum voltage 62 in the range of −15V to −25V. In the presently preferred embodiment, the maximum voltage 160 of the second square wave voltage signal LB is approximately equal to the maximum voltage 146 of the first square wave voltage signal LA, and the minimum voltage 162 of the second square wave voltage signal LB is equal to the minimum voltage 148 of the first square wave voltage signal LA.

The second square wave voltage signal LB is symmetrical about a line 144, which line 144 indicates a negative offset voltage of the second square wave voltage signal LB. In the presently preferred embodiment, the offset voltage of the second square wave voltage signal LB is approximately equal to the offset voltage 142 of the first square wave voltage signal LA.

By offsetting the first and the second square wave voltage signals LA, LB with a negative voltage relative to ground 140, a substantially slower corrosion of the two-wire cable 28 is achieved. With such a negative offset, the current will run from the ground 140 to the copper material of the two-wire cable 26, resulting in an alkaline process, which is less hazardous to the copper material than an electron acceptor donating process relative to ground 140, as in the case with a positive offset, which would force the current to run from the copper material to the ground 140.

The computer 34 may have a monitor 37 for displaying the operation of the two-wire controlling and monitoring system 10. The localized irrigation control units 18 may be situated in a housing or cabinet (not shown) made of a wear-resistant material, such as a metal like aluminum or steel, or a plastic like PVC, PP or PE. The housing protects the localized irrigation valve control units 18 from any hostile environment the housing is positioned in.

The controllable irrigation valves 22 may be magnetically, electrically, hydraulically or pneumatically operated or combinations thereof. According to the presently preferred embodiment, the controllable irrigation valves 22 are electromagnetically operated by a solenoid that holds the valve in an open or closed position. Variations of current applied to the solenoid cause the induction of a magnetic field, which subsequently opens or closes the valve.

Each of the irrigation valve control units 18 receives transmissions of schedules of instructions from the power and control unit 30 through the two-wire cable 26. A pair of control and power inputs 24 connects each irrigation valve control unit 18 to the two-wire cable 26. Each irrigation valve control unit 18 includes a decoder (not shown) for interpreting the schedules of instructions sent by the power and control unit 30. The absolute voltage difference between each of the control and power inputs 24 is constant, except at the brief moment of alternation or polarity change. Thus, the irrigation valve control units 18 will always be powered. Each of the irrigation valve control units 18 may have a separate address, and an instruction for opening or closing a specific controllable irrigation valve 22 associated with a specific irrigation valve control unit 18 may involve performing a pattern of DC polarity alternations having different pulse widths of the DC voltage applied on the power and control outputs 28. The irrigation valve control units 18 may also be able to send information to the power and control unit 30 by short circuiting the two wire cable 26. Such information may typically be an acknowledgement that the specific controllable irrigation valve 22 has opened or closed.

Figure 2:
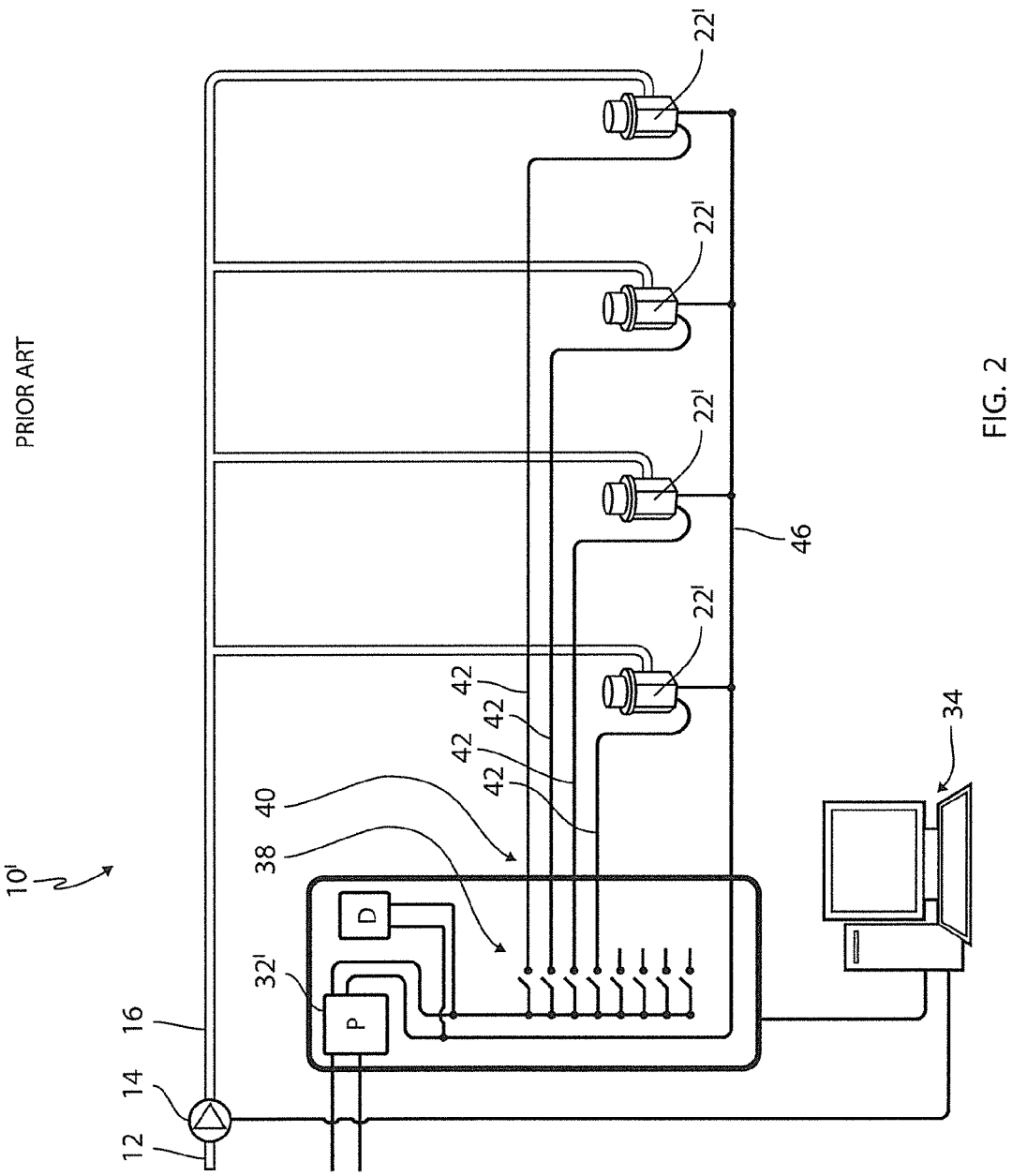
FIG. 2 is a schematic view of a multi wire irrigation control system.

FIG. 2 shows a multi-wire irrigation control system 10'. The multi-wire irrigation control system 10' comprise the water inlet connection 12, the pump 14, the water pipeline 16, and a plurality of controllable irrigation valves 22' similar to the two wire irrigation control system of FIG. 1. The irrigation valve control units have been omitted, and instead each of the controllable irrigation valves 22' of the plurality of controllable irrigation valves 22' is connected to a switchboard 38 of a multi-wire power and control unit 40 via a first or dedicated valve control line 42. The switchboard 38 is connected to a power supply 32' similar to that of the two wire irrigation control system of FIG. 1, but the power supply 32' of the multi-wire irrigation control system 10' may be set to provide a low voltage AC current instead of a DC current. Thus, a rectifying bridge may not be required. The switchboard 38 is typically controlled by a computer 34 that is either user-operated or controlled by a software program. The switchboard 38 has a number of power outlets, each of which may be connected to a first or dedicated valve control line 42.

By operating the switchboard 38, power may selectively be applied or not applied to any of the first valve control lines 42, each of which, in turn, is connected to a specific controllable irrigation valve 22', thereby selectively opening or closing any of the controllable irrigation valves 22'. The return current is transmitted back to the power supply 32' via a common return line 46. The multi-wire power and control system 10' also comprises a phase detector 44 that is configured for detecting any phase difference between the voltage and the current of the valve control lines 42. A phase shift will occur when any of the controllable irrigation valve 22' is opening, since an opening of the controllable irrigation valve 22' will involve powering the solenoid of the controllable irrigation valve 22'. This will be explained in more detail below in connection with FIG. 3A.

FIG. 3A shows a wired irrigation control system 10" having a multi-wire part and a two wire part. The irrigation control system 10" comprises both a first, multi-wire power and control unit 40 and a second, two wire power and control unit 30'. The multi-wire power and control unit 40 comprises a power supply 32' and a switchboard 38 connected to the power supply 32'. The switchboard 38 is in turn connected to the dedicated valve control lines 42, each in turn being connected to one of a first plurality of controllable irrigation valves 22'. The return line from each of the first plurality of controllable irrigation valves 22' back to the power supply 32' is constituted by a common return line 46.

The two wire power and control unit 30' comprises a power supply 32, similar to the power supply described in connection with FIG. 1, and a controller 36' that differs from the controller described in connection with FIG. 1, in that the controller 36' is not connected to a computer but to the switchboard 38 of the multi-wire power and control unit 40 via dedicated valve representation lines 50. The switchboard 38 is controlled by the computer 34, which as described in connection with FIG. 2, is either user-controlled or running a software program. The controllable irrigation valves 22' that are directly connected to the multi-wire power and control unit 40 via the first valve control lines 42 are opened and closed as described in connection with FIG. 2. When a specific controllable irrigation valve in a second plurality of controllable irrigation valves 22 that is connected to the two wire power and control unit 30' is to be opened or closed, the computer 34 sends a signal to the switchboard 38 to supply or not supply a current through the specific valve representation line 50 representing the specific controllable irrigation valve 22. The controller 36' then establishes the schedules of instructions as described in connection with FIG. 1.

The controller 36' of the two wire power and control unit 30' is connected to a second or further valve control line 48. A plurality of irrigation control units 18, each with an associated controllable irrigation valve 22 in the second plurality of controllable irrigation valves, is connected between the further valve control line 48 and the common return line 46. The two wire cable is thus constituted by the further valve control line 48 and the common return line 46. In this way, all of the controllable irrigation valves 22, 22' may be controlled by the same switchboard 38 and computer 34. No additional switchboard or computer is required.

An existing multi-wire power and control unit 40 may thus be expanded by merely installing a single cable, i.e. the further valve control line 48, from the new two wire power and control unit 30' and using the already existing common return line 46. Since two independent power sources 32, 32' are used, the common return line 46 will have a floating voltage relative to ground, i.e., any operations on the controllable irrigation valves 22, 22' will not influence the voltage difference between the common return line 46 and the further valve control line 48, and vice versa.

The phase shift detector 44 will, as previously mentioned, detect a phase shift between the voltage and the current on the first valve control lines 42 and valve representation lines 50. The phase shift detector 44 typically detects the voltage and the current output of the power supply 32', although it may optionally detect the voltage and current of each of the first valve control lines 42 and valve representation lines 50 of the switchboard 38. If a specific controllable irrigation valve 22, 22' is working properly, the solenoid of the valve will move and constitute an inductive load. Such inductive load will cause a phase shift between the voltage and the current on the specific first valve control line 42 and on the current output of the power supply 32'. The phase shift may be detected by the phase shift detector 44, which may indicate that the valve has changed state successfully. On the other hand, if the specific controllable irrigation valve 20, 22' cannot move, e.g., because of a short circuit or a broken wire, the load will be entirely resistive and there will be no phase shift between current and voltage, and thus the phase shift detector 44 will indicate that the valve has not been operating correctly.

The valve representation lines 50 are not directly connected to the solenoid of the controllable irrigation valves 22, and thus a correctly operating valve will give no indication in the voltage and current in the valve representation lines 50. The valve representation lines 50 typically allow a very small current to flow if the switchboard 38 is appropriately activated merely for the controller 36' of the two wire power and control unit 30' to detect. Thus, ordinarily, the phase shift detector 44 cannot detect a phase shift on the valve representation lines 50, and thus the phase shift detector 44 cannot be used to determine whether or not the controllable irrigation valves 22 work correctly. Such determination must be made in each of the irrigation valve control units 18 and communicated to the two wire power and control unit 30' by means of instructions, which may be transmitted by temporarily short circuiting the further valve control line 48 and the common return line 46 at different pulse widths. In order for the appropriate valve representation line 50 to experience a phase shift between voltage and current, the two wire power and control unit 30' may connect an inductive or capacitive load to the valve representation line 50, thus simulating a phase shift which may be detected by the detector 44. Preferably, a capacitive load is used.

The further valve control line 48 and the common return line 46 are optionally connected to a flow meter controller 52, in turn connected to a flow meter 54 located in the water pipeline 16 adjacent the pump 14. The flow meter 54 measures a value representing the flow of water though the pump 14. In this way the irrigation may be monitored. Such flow meters 54 may be placed at different locations along the water pipeline 16 representing the flow of water at that location. The flow meter controller 52 communicates the value to the two wire power and control unit 30' using the further valve control line 48 and the common return line 46.

The power sources 32, 32' should provide a galvanic separation between the two wire power and control unit 30' and the multi-wire power and control unit 40. Instead of using a fully separate power source for each of the two wire power and control unit 30' and the multi wire power and control unit 40', a common multi-winding transformer (not shown) may be used. The multi-winding transformer establishes a galvanic separation between a first secondary winding providing electric power to the first plurality of controllable irrigation valves 22' and a second secondary winding providing electric power to the second plurality of controllable irrigation valves 22. Galvanic separation may also be provided by capacitors or inductors.

Figure 3B:
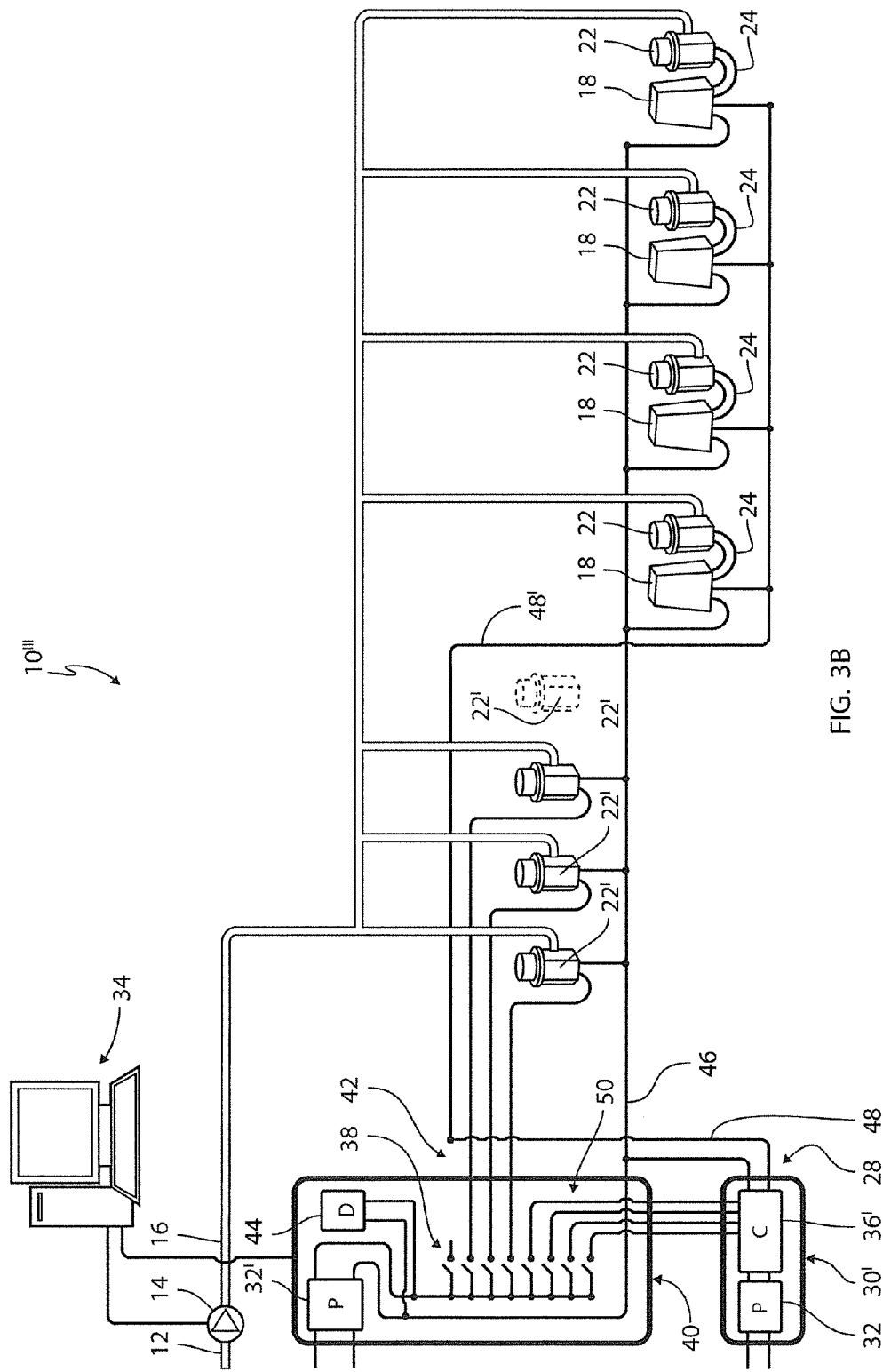
FIG. 3B is a schematic view showing a different mode of retrofitting an existing multi-wire irrigation system.

FIG. 3B shows a different mode of retrofitting an existing multi wire system 10''' that is similar to the system of FIG. 3A. The system 10''' comprises a multi-wire irrigation control system retrofitted by a two wire irrigation control system, and it does not require any additional wires to be laid, since one of the existing first valve control lines 42 may be used if one of the first plurality of controllable irrigation valves 22' is omitted (as shown in phantom). In this way, one of the existing first valve control lines 42 may be disconnected from the switchboard 38 of the first, multi-wire power and control unit 40 by simply fixing the associated switch in the open position. Thus, one of the power and control outputs 28 of the two line power and control unit 30' may be connected to the thus disconnected first valve control line 42 by the second or further valve control line 48, the associated controllable irrigation valve 22' having been discarded or omitted, and another piece 48' of the second or further valve control line 48 may be used for connecting the disconnected valve control line 42 to the second plurality of controllable irrigation valves 22 of the two wire irrigation control system.

Figure 3C:
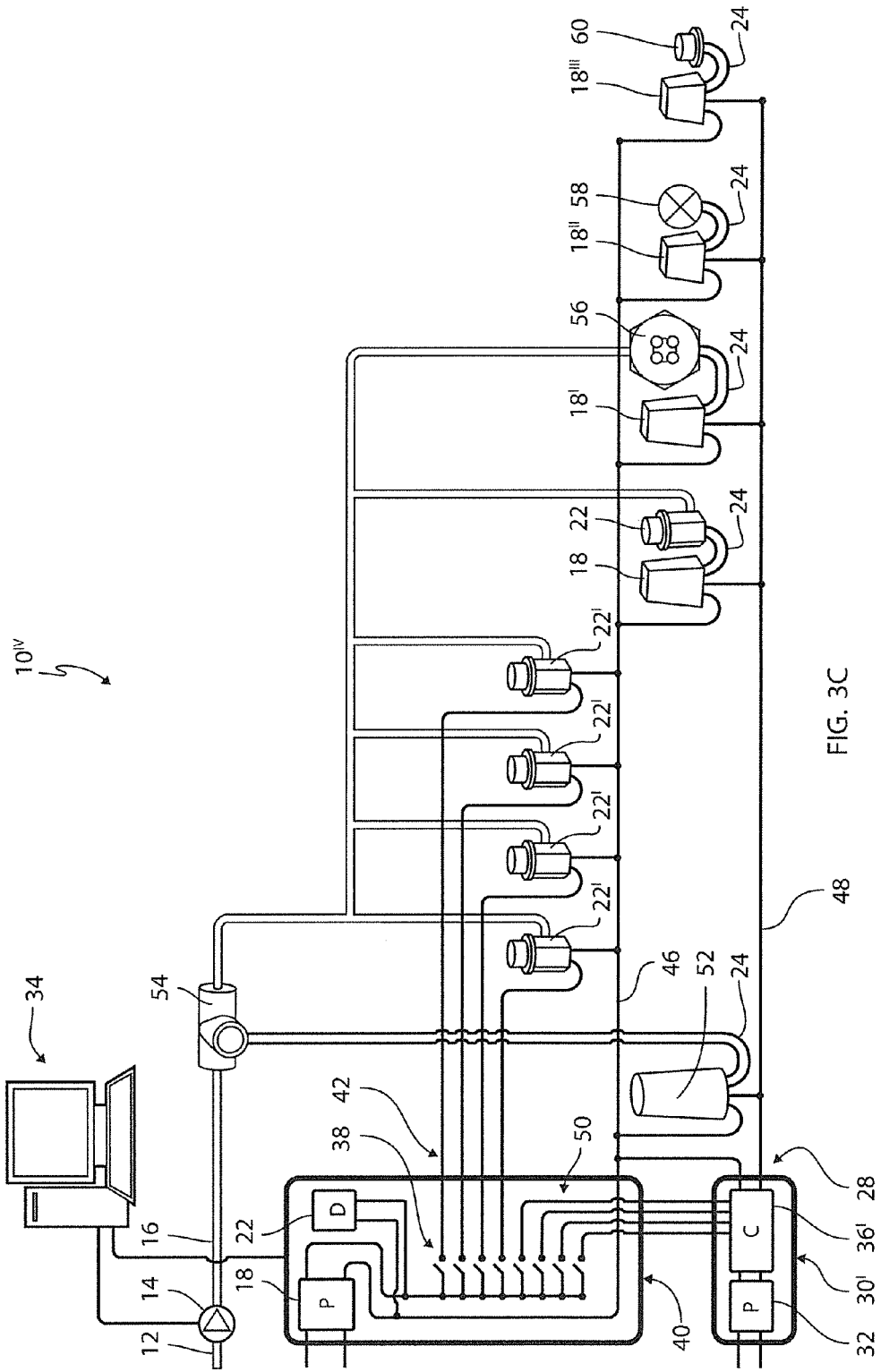
FIG. 3C is a schematic view of a wired irrigation control system having supplementary equipment.

FIG. 3C shows a circuit diagram of a wired irrigation system $10^{IV}$ having supplementary equipment. Instead of controllable irrigation valves 22, other equipment may be connected and controlled by the two wire system. For instance, a fountain 56 may be connected via a fountain control unit 18' to the second valve control line 48 and the common return line 46 in a similar way as a controllable irrigation valve 22. A water sensor 58 may be connected via a sensor control unit 18" to the second valve control line 48 and the common return line 46 and communicate the occurrence of water at a location of soil, e.g. for determining whether or not the controllable irrigation valves are working. Even non-water devices may be connected, such as a street light 60 via a light control unit 18'''.

Figure 4A:
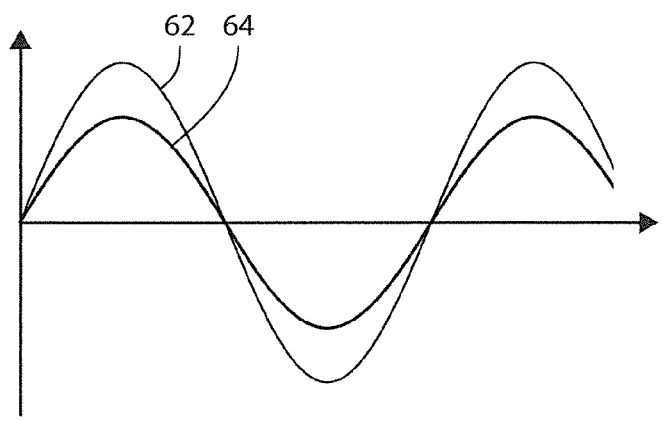
FIG. 4A shows a voltage and current graph of an irrigation control system having a resistive load.

FIG. 4A shows a voltage and current graph of a system having a resistive load. The voltage 62 and the current 64 are in phase. This is the situation when the load is resistive, such as when a line is short circuited.

Figure 4B:
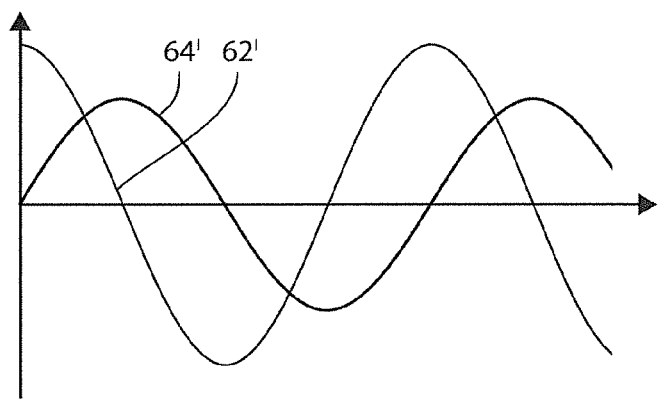
FIG. 4B shows a voltage and current graph of an irrigation control system having an inductive load.

FIG. 4B shows a voltage and current graph of a system having an inductive load. The voltage 62' is phase shifted by +90 degrees relative to the current 64'. This is the situation when the load is inductive, such as in the valve control lines when a solenoid of a valve is opened.

Figure 4C:
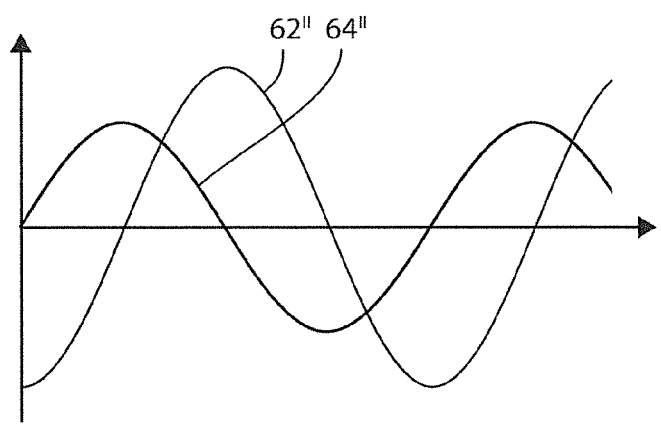
FIG. 4C shows a voltage and current graph of an irrigation control system having a capacitive load.
Figure 5A:
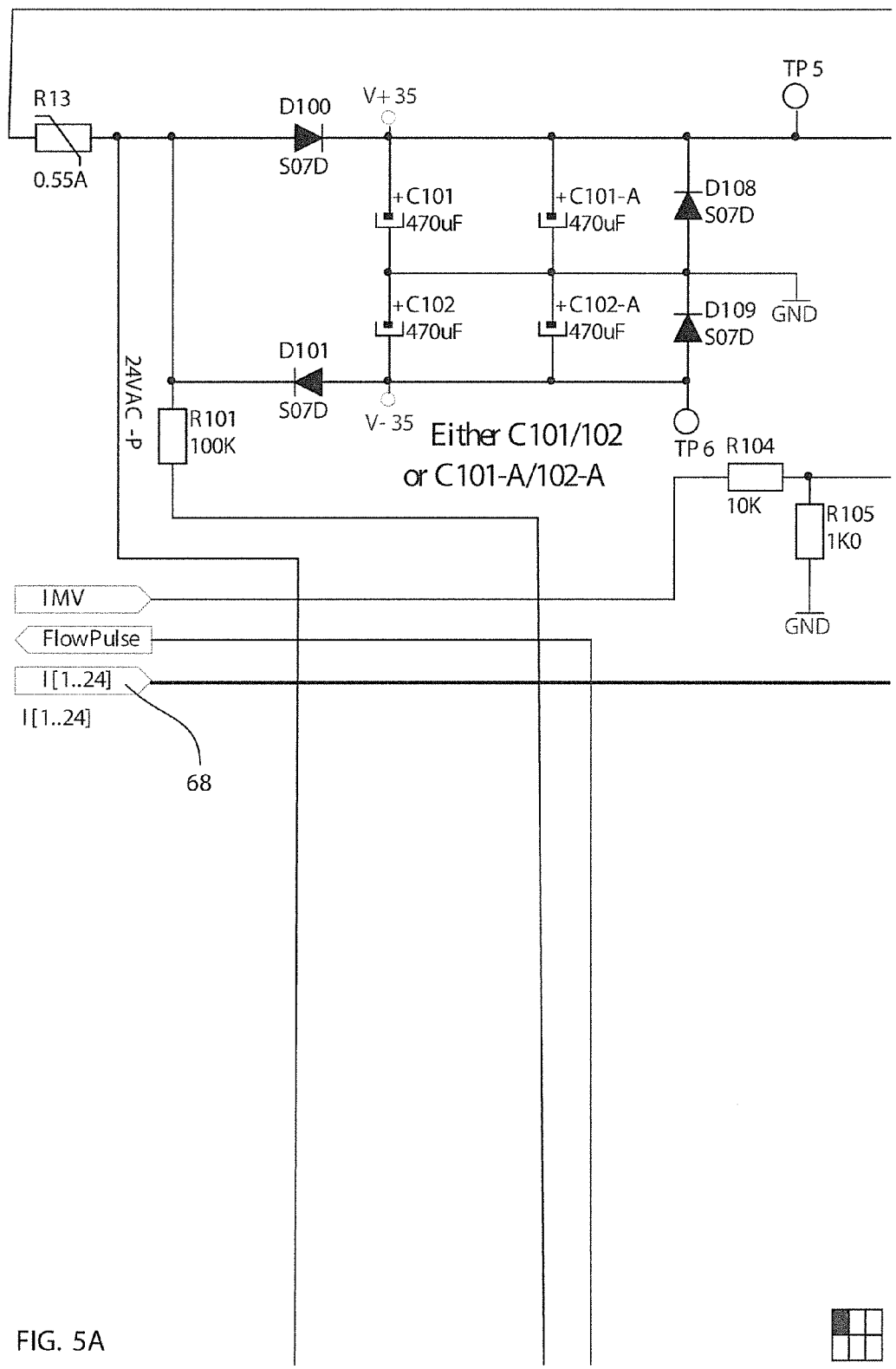
FIGS. 5A-5F is a series of circuit diagrams that together show a first circuit board layout of an irrigation control system in accordance with the present disclosure.
Figure 5B:
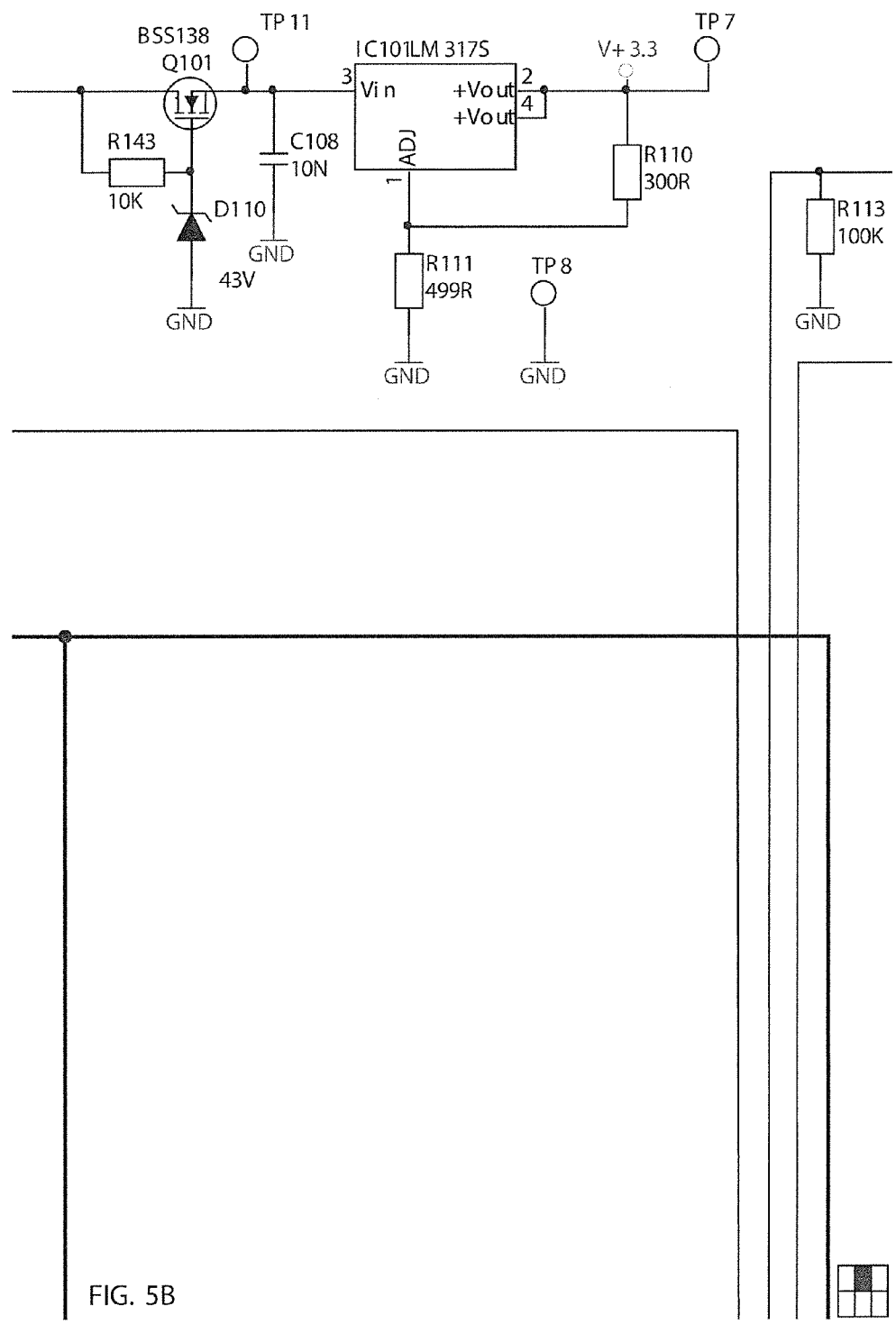
Figure 5C:
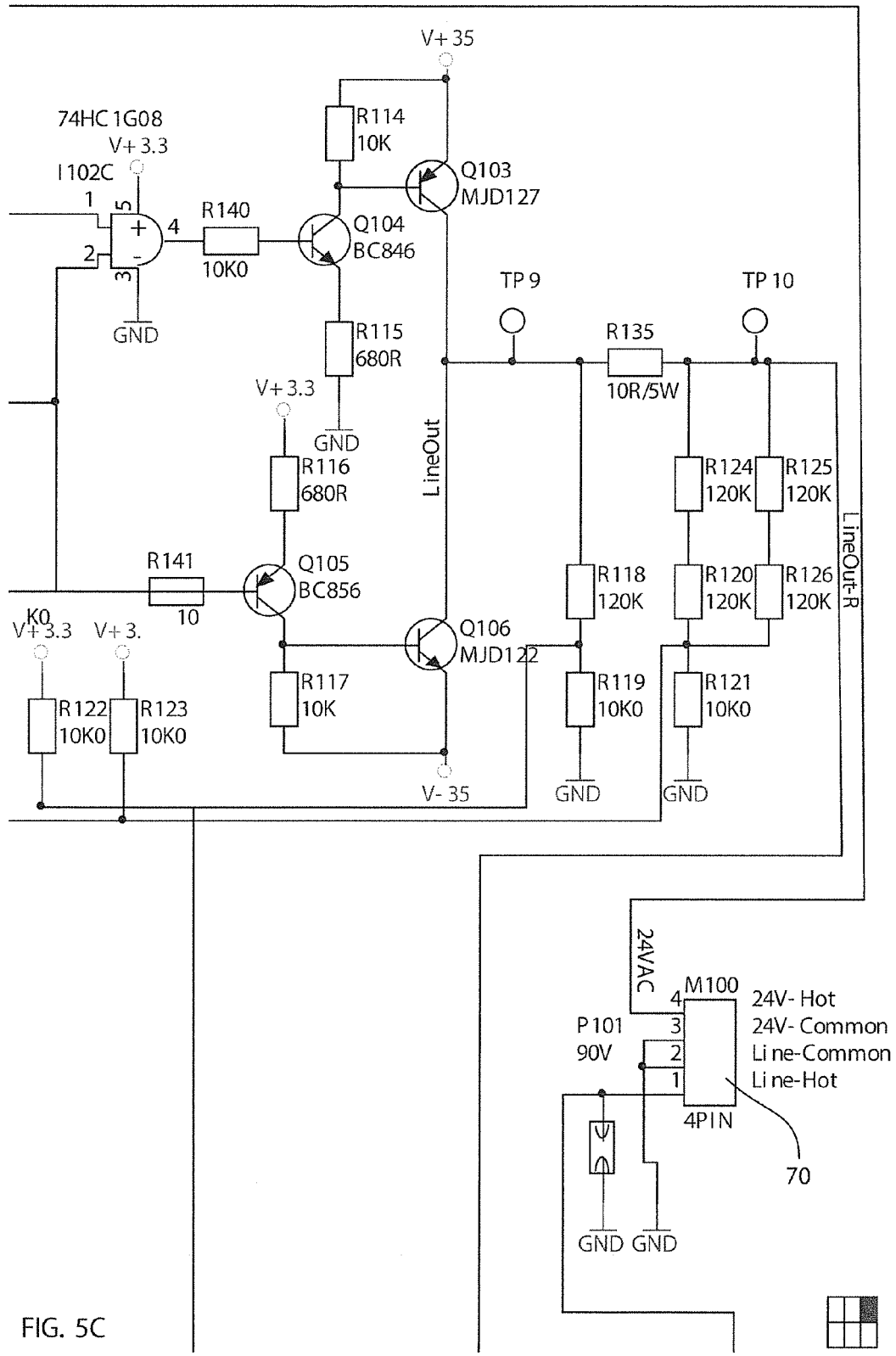
Figure 5D:
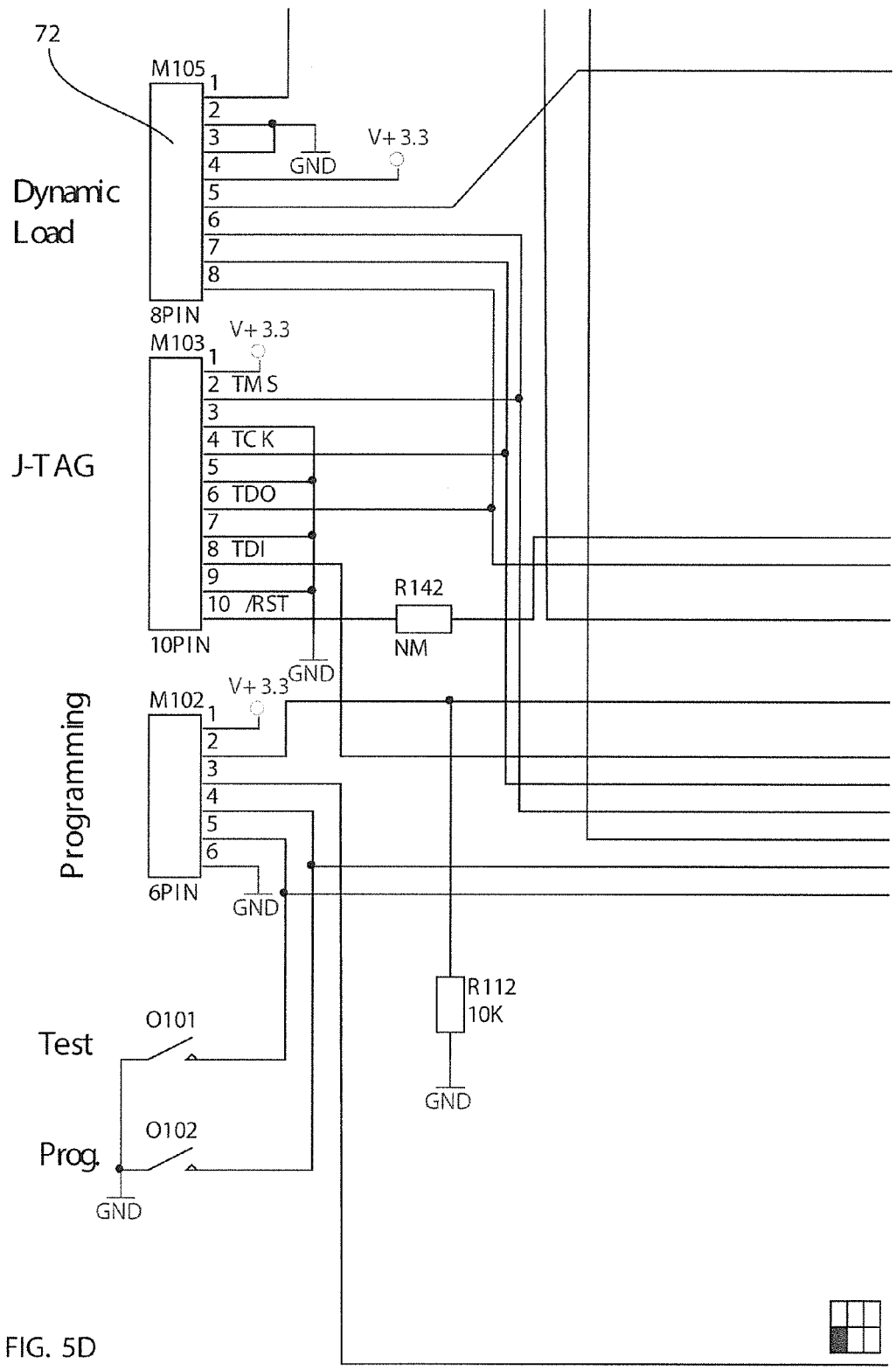
Figure 5E:
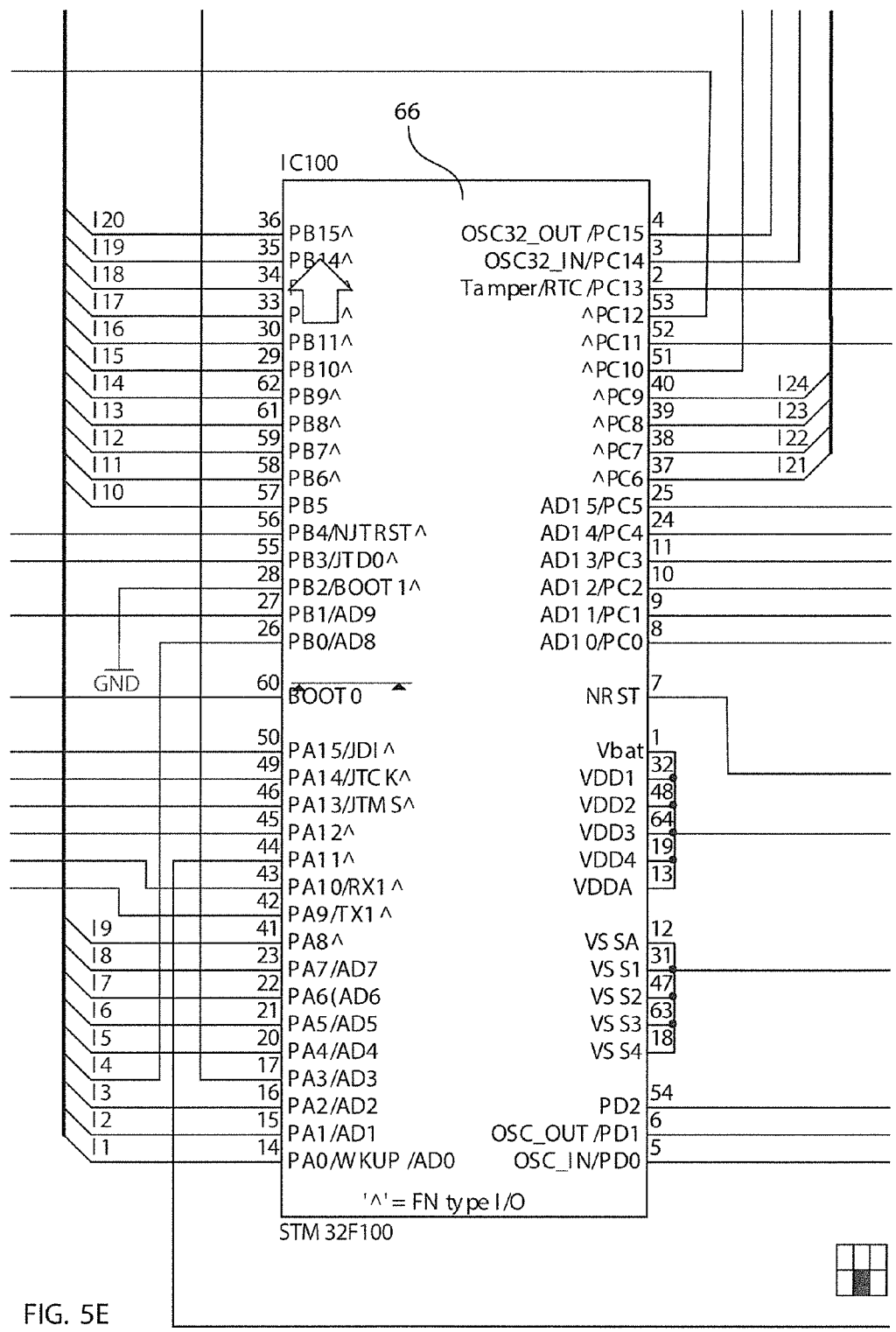
Figure 5F:
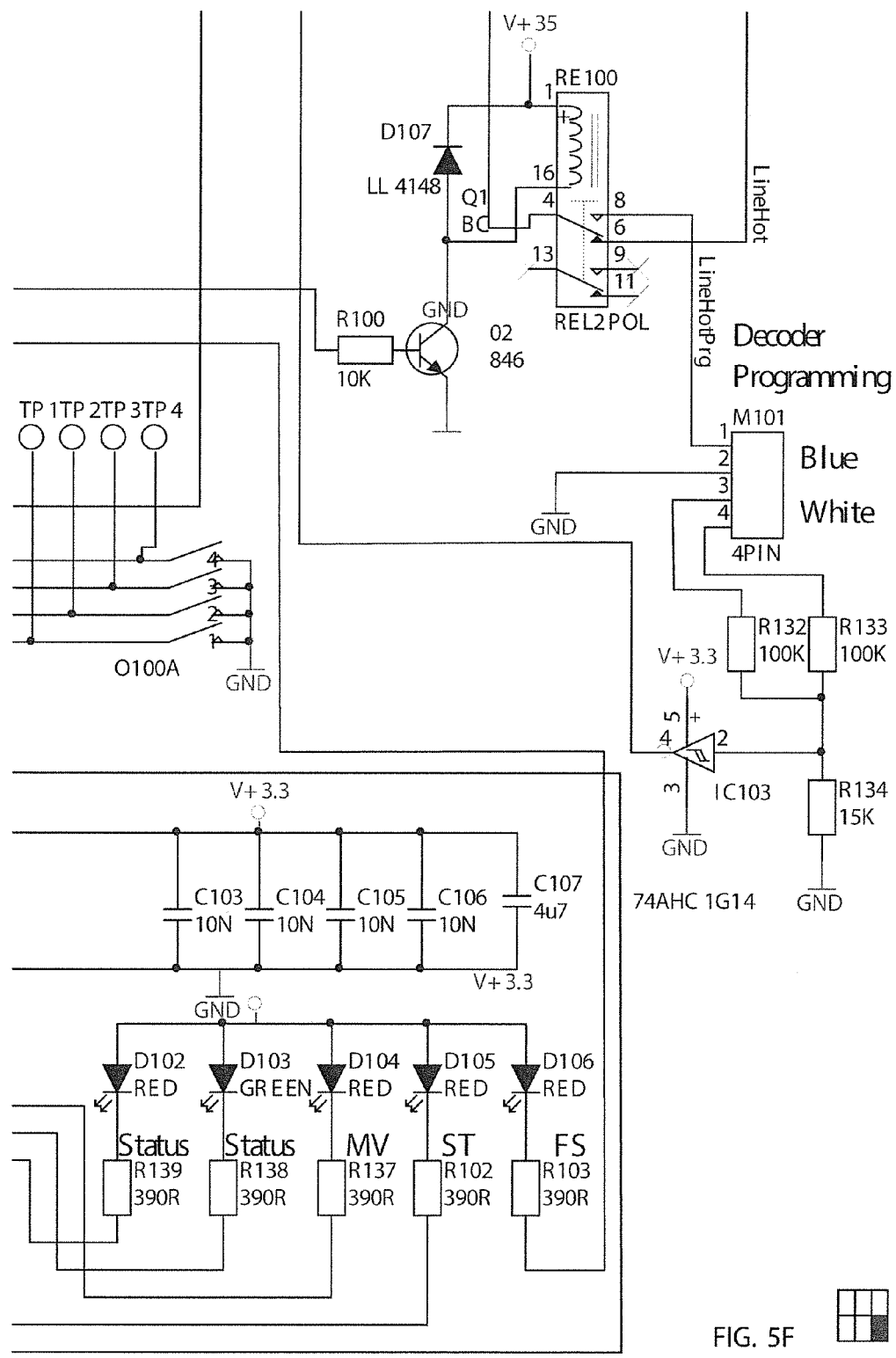

FIG. 4C shows a voltage and current graph of a system having a capacitive load. The voltage 62" is phase shifted by −90 degrees relative to the current 64". This is the situation when the load is capacitive, such as when a capacitor is used for simulating a phase shift in the valve representation lines.

FIGS. 5A-5F comprise a series of circuit diagrams that together show a first circuit board layout. The first circuit board layout handles the communication with the two wire network based on the input from the valve representation lines. FIGS. 5A-5F should be assembled as indicated in the lower right corner of each figure. The first circuit board forms part of the controller of FIG. 3A and features a centrally located multiplexer IC100 (FIG. 5E, reference numeral 66) receiving as an input signal I[1 . . . 24] (FIG. 5A, reference numeral 68) the valve representation lines and transmitting on the M100 (FIG. 5C, reference numeral 70) the two lines representing the further valve control line and the common return line. A dynamic load (FIG. 5D, reference numeral 72) communicates a control signal to a second circuit board layout described below.

Figure 6B:
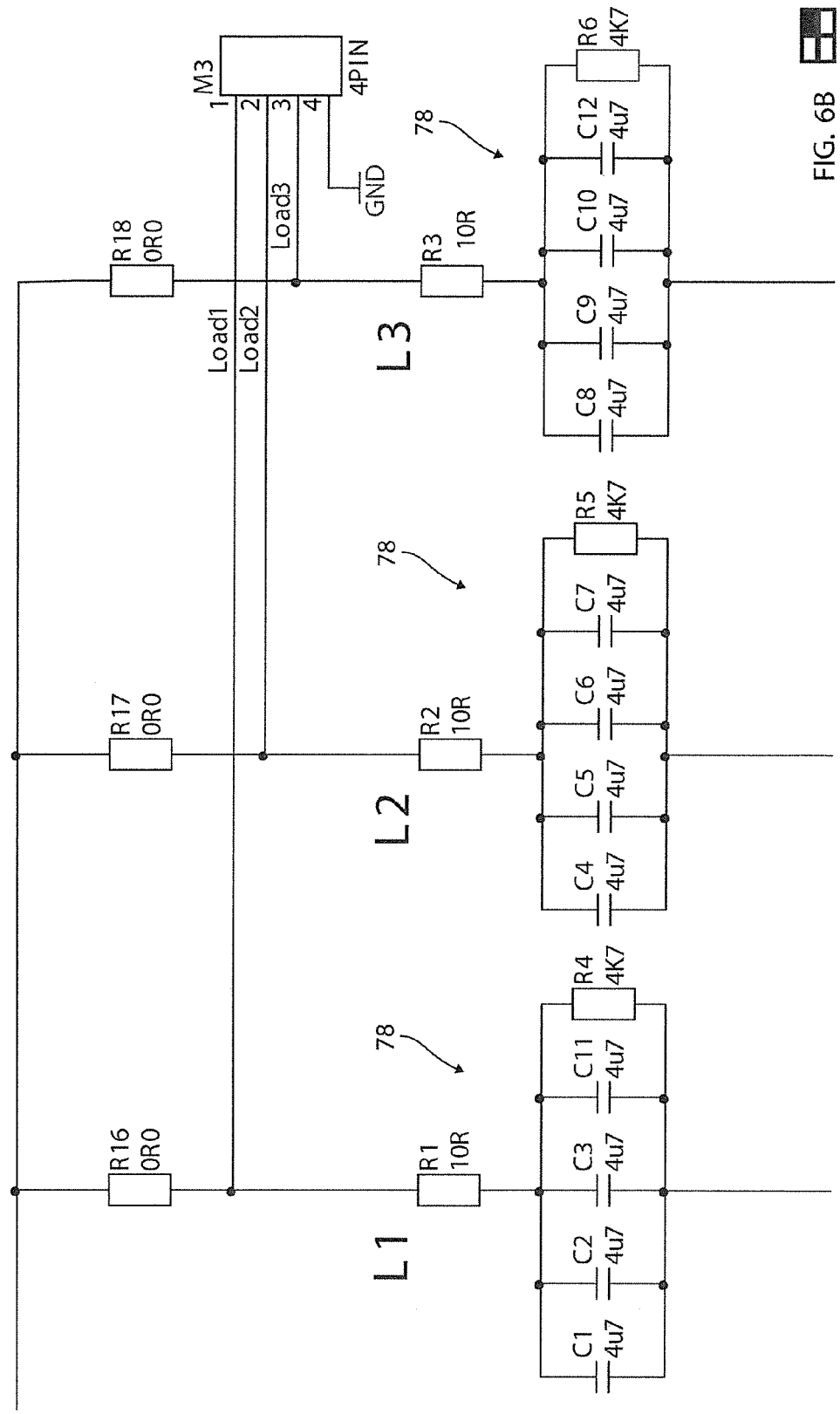
Figure 6C:
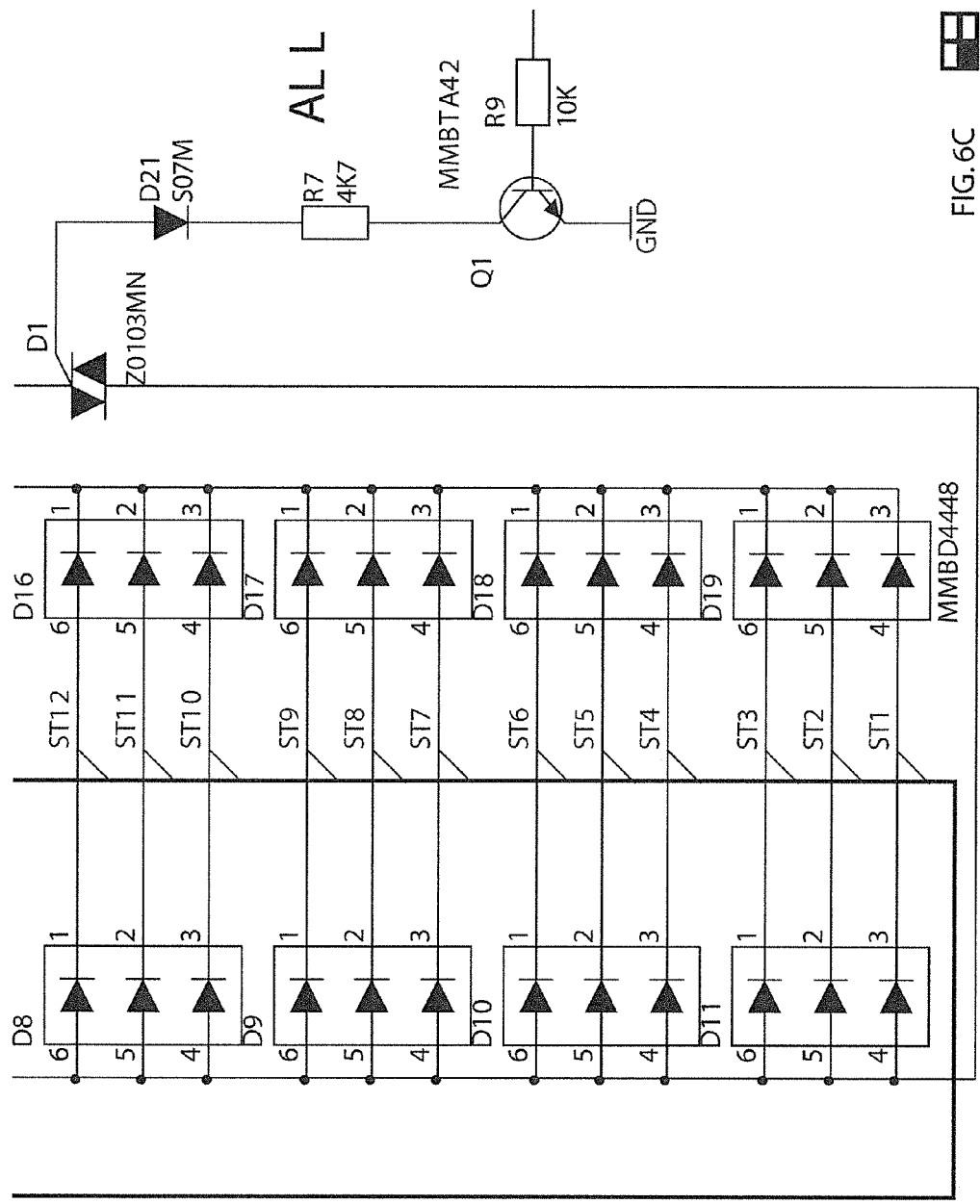
Figure 6D:
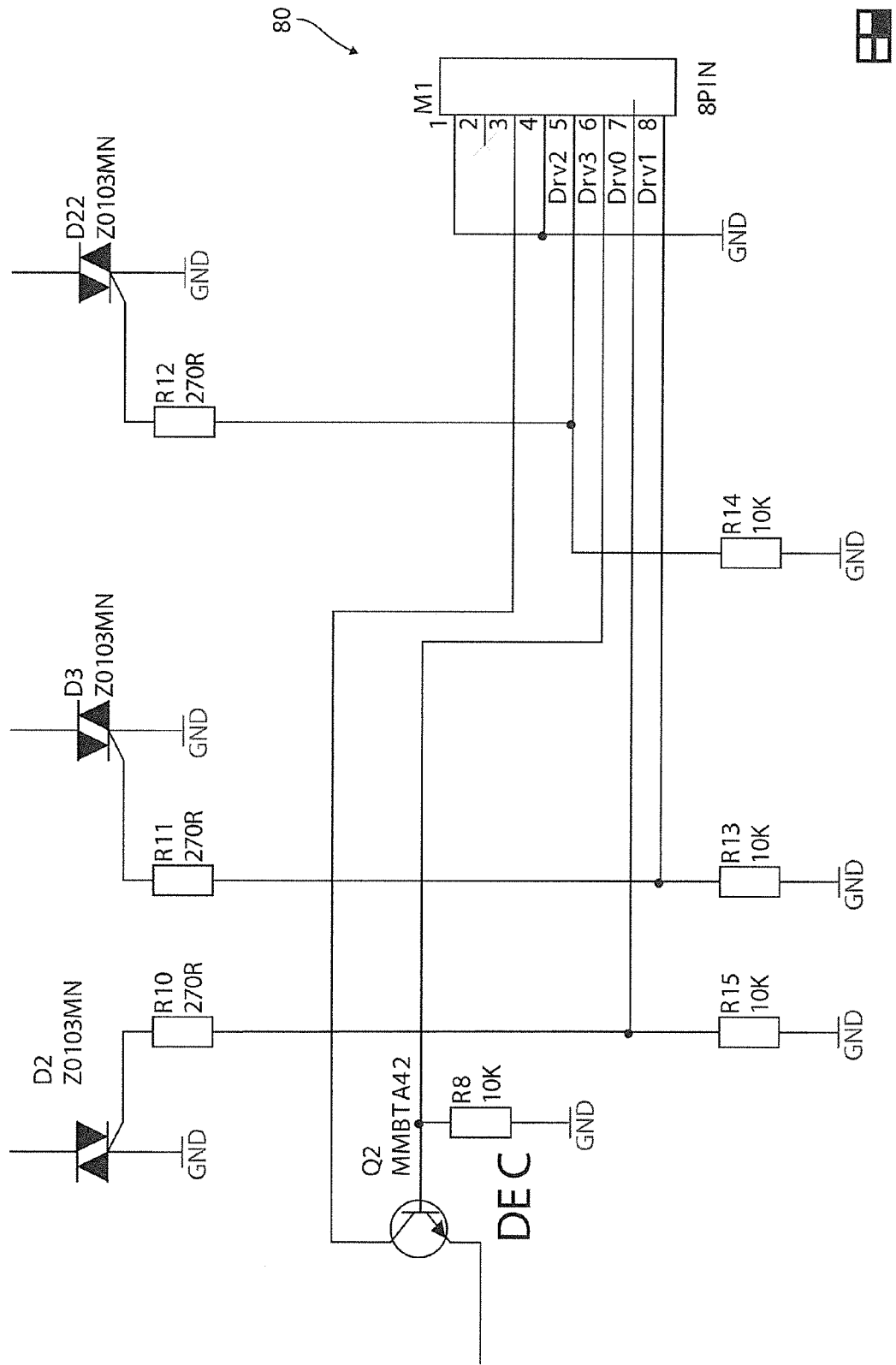

FIGS. 6A-6D comprise a series of circuit diagrams that together show a second circuit board layout. The second circuit board layout handles the phase shift on the valve representation lines based on valve information received from the first circuit board. FIGS. 5A-5F should be assembled as indicated in the lower right corner of each figure. The second circuit board forms part of the controller of FIG. 3A and features a centrally located array of electronic switches D4-D11 and D13-D19 (FIG. 6A, reference numeral 74) receiving as an input signal I[1 . . . 24] (FIG. 6A, reference numeral 76) the valve representation lines, and connecting the valve representation lines to the set of capacitors L1-L3 (FIG. 6B, reference numeral 78). The electronic switches are controlled by a signal received at the 8PIN (FIG. 6D, reference numeral 80).

Figure 7A:
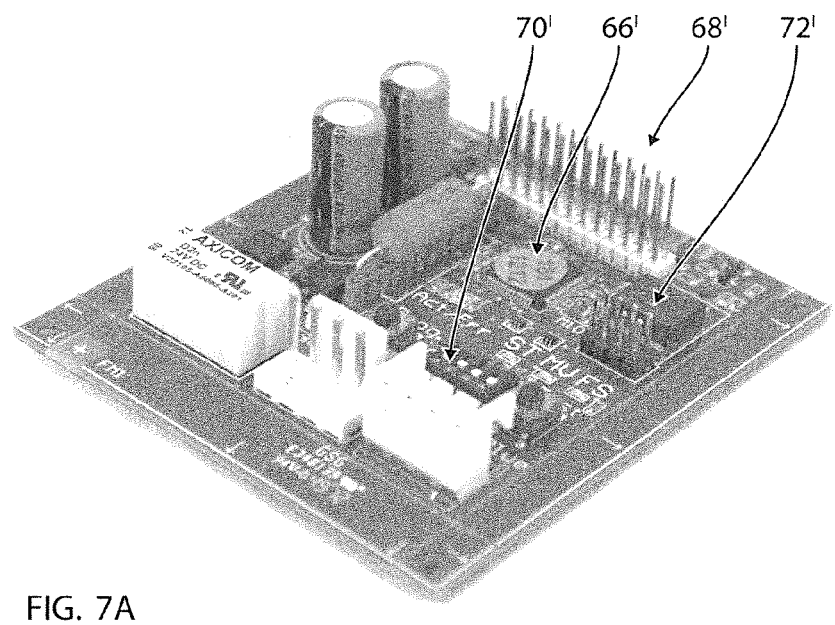
FIG. 7A is a perspective view of the first circuit board layout.
Figure 7B:
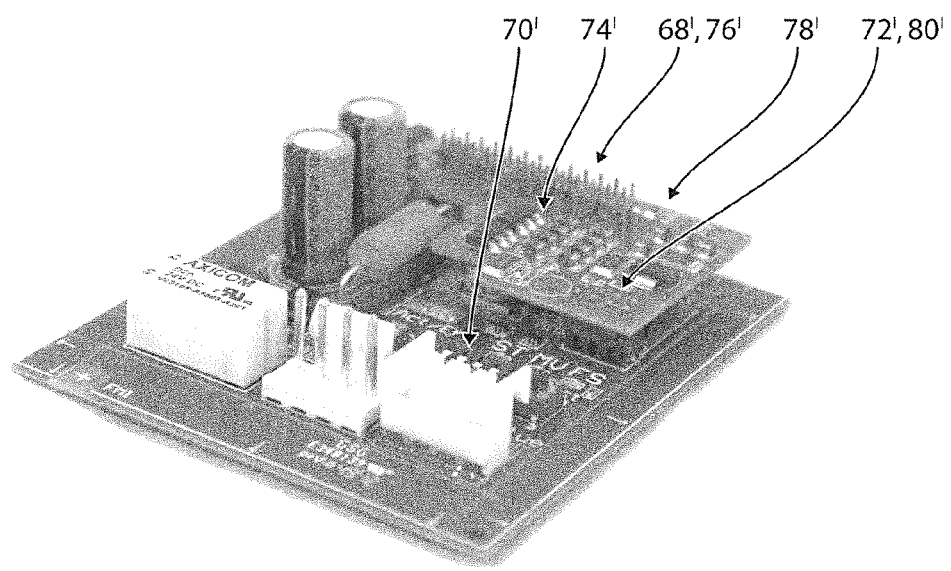
FIG. 7B is a perspective view of the first and second circuit board layouts together.

FIG. 7A shows a perspective view of the first circuit board layout showing a preferred position of the input pins 68' of the valve representation lines, the multiplexer 66', the two wire output 70', and the dynamic load 72'. FIG. 7B shows a perspective view of the first and second circuit board layouts assembled together. The second circuit board is connected to the input pins 68' and 76' of the valve representation lines and the dynamic load 72' and 80'. The second circuit board features the electronic switches 74' and the capacitors 78'.

What is claimed is:

1. A wired controlling and monitoring system for irrigation of localized areas of soil from a water pipeline, comprising:
   a first power and control unit having a multitude of power outlets;
   a plurality of first valve control lines, each connected to an associated one of the multitude of power outlets;
   a first plurality of controllable irrigation valves, each positioned in a dedicated position at first specific areas of the localized areas of soil, each of the first plurality of controllable irrigation valves being configured for connection to the water pipeline, and each of the first plurality of controllable irrigation valves being connected by an individual one of the plurality of first valve control lines to the one of the multitude of power outlets with which the individual one of the plurality of first valve control lines is associated;
   a common return line interconnecting all of the first plurality of controllable irrigation valves and the first power and control unit;
   a second plurality of controllable irrigation valves, each positioned at a dedicated position at second specific areas of the localized areas of soil, each of the second plurality of controllable irrigation valves being configured for connection to the water pipeline, and each of the second plurality of controllable irrigation valves being controlled by an irrigation valve control unit having first and second inputs; and
   a second power and control unit having first and second power and control outputs, the first power and control output being connected to the common return line together with the first input of each of the irrigation valve control units, the second power and control output being connected to the second input of each of the irrigation valve control units via a second valve control line, the second power and control unit configured for supplying power to the irrigation valve control units by applying a first square wave voltage signal defining a voltage maximum having a first pulse width and defining a voltage minimum having a second pulse width to the first power and control output, and simultaneously applying a second square wave voltage signal similarly shaped but of inverted polarity as compared to the first square wave voltage signal to the second power and control output, the second power and control unit being operable for transmitting instructions to each of the irrigation valve control units via the second valve control lines and the common return line.

2. The wired controlling and monitoring system according to claim 1, wherein at least one of the first and second power and control units comprises an AC power supply.

3. The wired controlling and monitoring system according to claim 2, wherein the AC power supply includes a switch mode supply.

4. The wired controlling and monitoring system according to claim 2, wherein the AC power supply includes a transformer and a rectifying bridge.

5. The wired controlling and monitoring system of claim 1, wherein at least one of the first and second power and control units includes a DC voltage source.

6. The wired controlling and monitoring system according to claim 1, wherein the first power and control unit comprises an AC voltage source and the second power and control unit comprises a DC voltage source.

7. The wired controlling and monitoring system according to claim 1, wherein each of the first and second square wave voltage signals has a frequency lower than an AC power mains frequency.

8. The wired controlling and monitoring system according to claim 1, wherein the first power and control unit is controlled by a computer and includes a switchboard having the multitude of power outputs.

9. The wired controlling and monitoring system according to claim 1, wherein the second power and control unit is controlled by the first power and control unit.

10. The wired controlling and monitoring system according to claim 1, wherein the first and second power and control units are galvanically decoupled by a capacitor.

11. The wired controlling and monitoring system according to claim 1, further comprising a plurality of field sensors, each positioned in a dedicated position at specific areas of the localized areas of soil, the field sensors configured for providing specific irrigation parameters, each of the field sensors having first and second sensor outputs, the first sensor output being connected to the second valve control line, and the second sensor output being connected to the common return line.

12. The wired controlling and monitoring system according to claim 1, further comprising a plurality of controllable light sources, each positioned in a dedicated position at specific areas of the localized areas of soil, and each having first and second light source inputs, the first light source input being connected to the second valve control line, and the second light source input being connected to the common return line.

13. The wired controlling and monitoring system according to claim 1, further comprising a plurality of controllable fountains, each positioned in a dedicated position at specific areas of the localized areas of soil and having first and second fountain control inputs, the first fountain control input being connected to the second valve control line, and the second fountain control input being connected to the common return line.

14. The wired controlling and monitoring system according to claim 1, wherein the second plurality of controllable irrigation valves comprises between 3 and 1000 controllable irrigation valves.

15. A method of operating a wired controlling and monitoring system for irrigation of localized areas of soil from a water pipeline, wherein the wired controlling and monitoring system comprises:
- a first power and control unit having a multitude of power outlets;
- a plurality of first valve control lines, each connected to an associated one of the multitude of power outlets;
- a first plurality of controllable irrigation valves, each positioned in a dedicated position at first specific areas of the localized areas of soil, each configured for connection to the water pipeline, and each connected by an individual one of the plurality of first valve control lines to the one of the multitude of power outlets with which the individual one of the plurality of first valve control lines is associated;
- a common return line interconnecting all of the first plurality of controllable irrigation valves and the first power and control unit;
- a second plurality of controllable irrigation valves, each positioned at a dedicated position at second specific areas of the localized areas of soil, each of the second plurality of controllable irrigation valves being configured for connection to the water pipeline, and each of the second plurality of controllable irrigation valves being controlled by an irrigation valve control unit having first and second inputs; and
- a second power and control unit having first and second power and control outputs, the first power and control output being connected to the common return line together with the first input of each of the irrigation valve control units, the second power and control output being connected to the second input of each of the irrigation valve control units via a second valve control line;

the method comprising the steps of:
(a) selectively operating the first power and control unit for allowing an electrical current to flow from a selected one of the multitude of power outlets via one of the first valve control lines to the common return line for causing a selected controllable irrigation valve of the first plurality of controllable irrigation valves to assume an open position, thereby providing water from the pipeline to the dedicated position of the selected controllable irrigation valve of the first plurality of controllable irrigation valves;
(b) operating the second power and control unit so as to apply a first square wave voltage signal defining a voltage maximum having a first pulse width and defining a voltage minimum having a second pulse width to the first power and control output of the second power and control unit, and simultaneously applying a second square wave voltage signal similarly shaped but of inverted polarity as compared to the first square wave voltage signal to the second power and control output of the second power and control unit; and
(c) transmitting instructions from the second power and control unit to each of the irrigation valve control units via one of the second valve control lines and the common return line.

16. The method according to claim 15, wherein the first power and control unit includes a switchboard that is operable for applying a control signal to the second and control power unit indicating that a specific controllable irrigation valve of the second plurality of controllable irrigation valves should be opened.

17. A method of retrofitting an existing wired controlling and monitoring system for irrigation of localized areas of soil from a water pipeline, the method comprising the steps of:
(a) providing the existing wired controlling and monitoring system comprising:
- a first power and control unit having a multitude of power outlets;
- a plurality of first valve control lines, each connected to an associated one of the multitude of power outlets;
- a first plurality of controllable irrigation valves, each positioned in a dedicated position at first specific areas of the localized areas of soil, each of the first plurality of controllable irrigation valves being configured for connection to the water pipeline, and each of the first plurality of controllable irrigation valves being connected by an individual one of the plurality of first valve lines to the one of the multitude of power outlets with which the individual one of the plurality of first valve control lines is associated; and
- a common return line interconnecting all of the first plurality of controllable irrigation valves and the first power and control unit;
(b) installing a second plurality of controllable irrigation valves, each at a dedicated position at second specific areas of the localized areas of soil, each of the second plurality of controllable irrigation valves being configured for connection to the water pipeline, each of the second plurality of controllable irrigation valves being controlled by an irrigation valve control unit having first and second inputs;
(c) installing a second power and control unit having first and second power and control outputs, the first power and control output being connected to the common return line together with the first input of each of the irrigation valve control units, the second power and control output being connected to the second input of each of the irrigation valve control units via a second valve control line, the second power and control unit being operable for supplying power by applying a first square wave voltage signal defining a voltage maximum having a first pulse width and defining a voltage minimum having a second pulse width to the first power and control output, and simultaneously applying a second square wave voltage signal similarly shaped but of inverted polarity as compared to the first square wave voltage signal to the second power and control output; and
(d) transmitting instructions from the second power and control unit to each of the irrigation valve control units via one of the second valve control lines and the common return line.

18. The method according to claim 17, further comprising the steps of:
- disconnecting a selected one of the first valve control lines from the first power and control unit and one of the first plurality of controllable irrigation valves; and
- connecting the second power and control output to the second input of each of the irrigation valve control units of the second plurality of controllable irrigation valves via the selected one of the first valve control lines and the second valve control line.

19. A wired controlling and monitoring system for irrigation of localized areas of soil from a water pipeline, comprising:
- a first power and control unit having a multitude of power outlets;

a plurality of first valve control lines, each connected to an associated one of the multitude of power outlets;

a first plurality of controllable irrigation valves, each positioned in a dedicated position at first specific areas of the localized areas of soil, each of the first plurality of controllable irrigation valves being configured for connection to the water pipeline, each of the first plurality of irrigation valves being connected by an individual one of the plurality of first valve control lines to the one of the multitude of power outlets with which the individual one of the plurality of first valve control lines is associated;

a common return line interconnecting all of the first plurality of controllable irrigation valves and the first power and control unit;

a phase shift detector connected to the first power and control unit and operable for detecting a phase shift between current and voltage on any of the multitude of power outlets;

a second plurality of controllable irrigation valves, each positioned at a dedicated position at second specific areas of the localized areas of soil, each of the second plurality of controllable irrigation valves being configured for connection to the water pipeline, each of the second plurality of controllable irrigation valves being controlled by an irrigation valve control unit having first and second inputs; and a second power and control unit having first and second power and control outputs, the first power and control output being connected to the common return line together with the first input of each of the irrigation valve control units, the second power and control output being connected to the second input of each of the irrigation valve control units via a second valve control line, the second power and control unit being configured for supplying power by applying a first square wave voltage signal defining a voltage maximum having a first pulse width and defining a voltage minimum having a second pulse width to the first power and control output, and simultaneously applying a second square wave voltage signal similarly shaped but of inverted polarity as compared to the first square wave voltage signal to the second power and control output, the second power and control unit being operable for transmitting instructions to the irrigation valve control units and for receiving valve status information indicating a change from a closed state to an open state of a specific controllable irrigation valve of the second plurality of controllable irrigation valves from the irrigation valve control units via the second valve control line and the common return line, the second power and control unit being connected to the first power and control unit, each of the controllable irrigation valves of the second plurality of irrigation valves being represented by a valve representation line connected to the first power and control unit and the phase shift detector, the second power and control unit further comprising a phase shifting circuit that interconnects a specific valve representation line that represents the specific controllable irrigation valve of the second plurality of controllable irrigation valves and the common return line and that is operable to generate a phase difference representing a phase shift between current and voltage of the specific valve representation line when the valve status information indicates a change from a closed state to an open state of the specific controllable irrigation valve of the second plurality of controllable irrigation valves, the phase shift being detectable by the phase shift detector.

20. The wired controlling and monitoring system according to claim 19, wherein the phase shifting circuit comprise a capacitor.

21. The wired controlling and monitoring system according to claim 19, wherein the phase shifting circuit is configured to detect a phase shift between the current and the voltage on one of the power outlets of the first power and control unit.

22. The wired controlling and monitoring system according to claim 19, wherein the phase shifting circuit is configured to detect the phase shift between the current and the voltage on all of the multitude of power outlets of the first power and control unit.

23. A phase shifting circuit for a wired controlling and monitoring system for irrigation of localized areas of soil from a water pipeline, comprising:

a first power and control unit having a multitude of power outlets;

a plurality of first valve control lines, each connected to an associated one of the multitude of power outlets;

a first plurality of controllable irrigation valves, each positioned in a dedicated position at first specific areas of the localized areas of soil, each of the first plurality of controllable irrigation valves being configured for connection to the water pipeline, each of the first plurality of controllable irrigation valves being connected by an individual one of the plurality of first valve control lines to the one of the multitude of power outlets with which the individual one of the plurality of first valve control lines is associated;

a common return line interconnecting all of the first plurality of controllable irrigation valves and the first power and control unit;

a phase shift detector connected to the first power and control unit and operable for detecting a phase shift between current and voltage on any of the multitude of power outlets;

a second plurality of controllable irrigation valves, each positioned at a dedicated position at second specific areas of the localized areas of soil, each of the second plurality of controllable irrigation valves being configured for connection to the water pipeline, each of the second plurality of controllable irrigation valves being controlled by an irrigation valve control unit having a first and second inputs; and a second power and control unit having first and second power and control outputs, the first power and control output being connected to the common return line together with the first input of each of the irrigation valve control units, the second power and control output being connected to the second input of each of the irrigation valve control units via a second valve control line, the second power and control unit being operable for supplying power by applying a first square wave voltage signal defining a voltage maximum having a first pulse width and defining a voltage minimum having a second pulse width to the first power and control output, and simultaneously applying a second square wave voltage signal similarly shaped but of inverted polarity as compared to the first square wave voltage signal to the second power and control output, the second power and control unit being operable for transmitting instructions to the irrigation valve control units and for receiving valve status information indicating a change from a closed state to an open state of a specific controllable irrigation valve of the second plurality of controllable irrigation valves from the irrigation valve control units via the second valve control line and the common return line, the second power and control unit being connected to the first power and control unit, each of the controllable irrigation valves of the second plurality of controllable irrigation valves being represented by a valve representation line connected to the first power and control unit and the phase shift detector;

wherein the phase shift detector connected to a specific valve representation line representing the specific controllable irrigation valve and the common return line is operable to generate a phase difference representing a phase shift between current and voltage of the specific valve representation line when the valve status information indicates a change from a closed state to an open state of the specific controllable irrigation valve of the second plurality of controllable irrigation valves, the phase shift being detectable by the phase shift detector.

* * * * *